(12) United States Patent
Sagong et al.

(10) Patent No.: US 9,461,865 B2
(45) Date of Patent: Oct. 4, 2016

(54) APPARATUS AND METHOD FOR DEMODULATING HYBRID MODULATION SYMBOL IN WIRELESS COMMUNICATION SYSTEM USING HYBRID MODULATION SCHEME

(71) Applicant: Samsung Electronics Co., Ltd, Gyeonggi-do (KR)

(72) Inventors: Min Sagong, Gyeonggi-do (KR); Woomyoung Park, Gyeonggi-do (KR); Seokki Ahn, Gyeonggi-do (KR); Chiwoo Lim, Gyeonggi-do (KR); Sungnam Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/708,105

(22) Filed: May 8, 2015

(65) Prior Publication Data

US 2015/0326422 A1    Nov. 12, 2015

(30) Foreign Application Priority Data

May 9, 2014 (KR) ........................ 10-2014-0055372

(51) Int. Cl.
*H04L 27/36* (2006.01)
*H04L 27/38* (2006.01)
(Continued)

(52) U.S. Cl.
CPC ........... *H04L 27/38* (2013.01); *H04L 27/3488* (2013.01); *H04W 72/044* (2013.01)

(58) Field of Classification Search
CPC ............... H04W 72/044; H04L 27/38; H04L 27/2627; H04L 27/2649; H04L 27/3455; H04L 27/3488; H04L 27/2655
See application file for complete search history.

(56) References Cited

U.S. PATENT DOCUMENTS 5,066,957 A * 11/1991 Mizuno ..................... H04L 5/02
  342/352
2002/0097810 A1 * 7/2002 Seki ..................... H04L 27/3809
  375/295

(Continued)

FOREIGN PATENT DOCUMENTS

KR   10-2014-0125321 A    10/2014
KR      1020150024085 A     3/2015

OTHER PUBLICATIONS

International Search Report dated Aug. 4, 2015 in connection with International Application No. PCT/KR2015/004628; 3 pages.

(Continued)

*Primary Examiner* — Syed Haider

(57) ABSTRACT

The present disclosure relates to a pre-5th-Generation (5G) or 5G communication system for supporting higher data rates than 4th-Generation (4G) communication systems, such as Long Term Evolution. An apparatus and method for demodulating a hybrid modulation symbol is provided for use in a wireless communication using the hybrid modulation scheme. The apparatus includes a control channel receiver configured to acquire a hybrid modulation scheme change information from a control information received through a control channel, a constellation re-configurer configured to reconfigure a constellation diagram for use in demodulation with the hybrid modulation scheme change information provided by the control channel receiver, and a demodulator configured to demodulate a hybrid modulation symbol and a modified hybrid modulation symbol input when a reconfigured constellation diagram is received from the constellation re-configurer based on the reconfigured constellation diagram.

33 Claims, 28 Drawing Sheets

(51) Int. Cl.
*H04W 72/04* (2009.01)
*H04L 27/34* (2006.01)

(56) References Cited

U.S. PATENT DOCUMENTS

| | | | |
|---|---|---|---|
| 2004/0131125 A1* | 7/2004 | Sanderford, Jr. | H04L 5/06 375/261 |
| 2005/0169400 A1* | 8/2005 | Chouly | H04N 21/4382 375/295 |
| 2010/0067606 A1 | 3/2010 | Feng et al. | |
| 2010/0323685 A1* | 12/2010 | Lopez | H04L 25/0212 455/422.1 |
| 2012/0039410 A1 | 2/2012 | Feher | |
| 2012/0045021 A1 | 2/2012 | Zhao et al. | |
| 2012/0250805 A1 | 10/2012 | Shin | |
| 2013/0308733 A1* | 11/2013 | Kato | H04L 25/0212 375/346 |
| 2014/0119322 A1* | 5/2014 | Wang | H04W 72/04 370/329 |
| 2014/0314005 A1 | 10/2014 | Sagong et al. | |

OTHER PUBLICATIONS

Hong, et al.; "FQAM: A Modulation Scheme for Beyond 4G Cellular Wireless Communication Systems"; Globecom 2013 Workshop-Emerging Technologies for LTE-Advanced and Beyond 4G; IEEE; Dec. 2013; 7 pages.

* cited by examiner

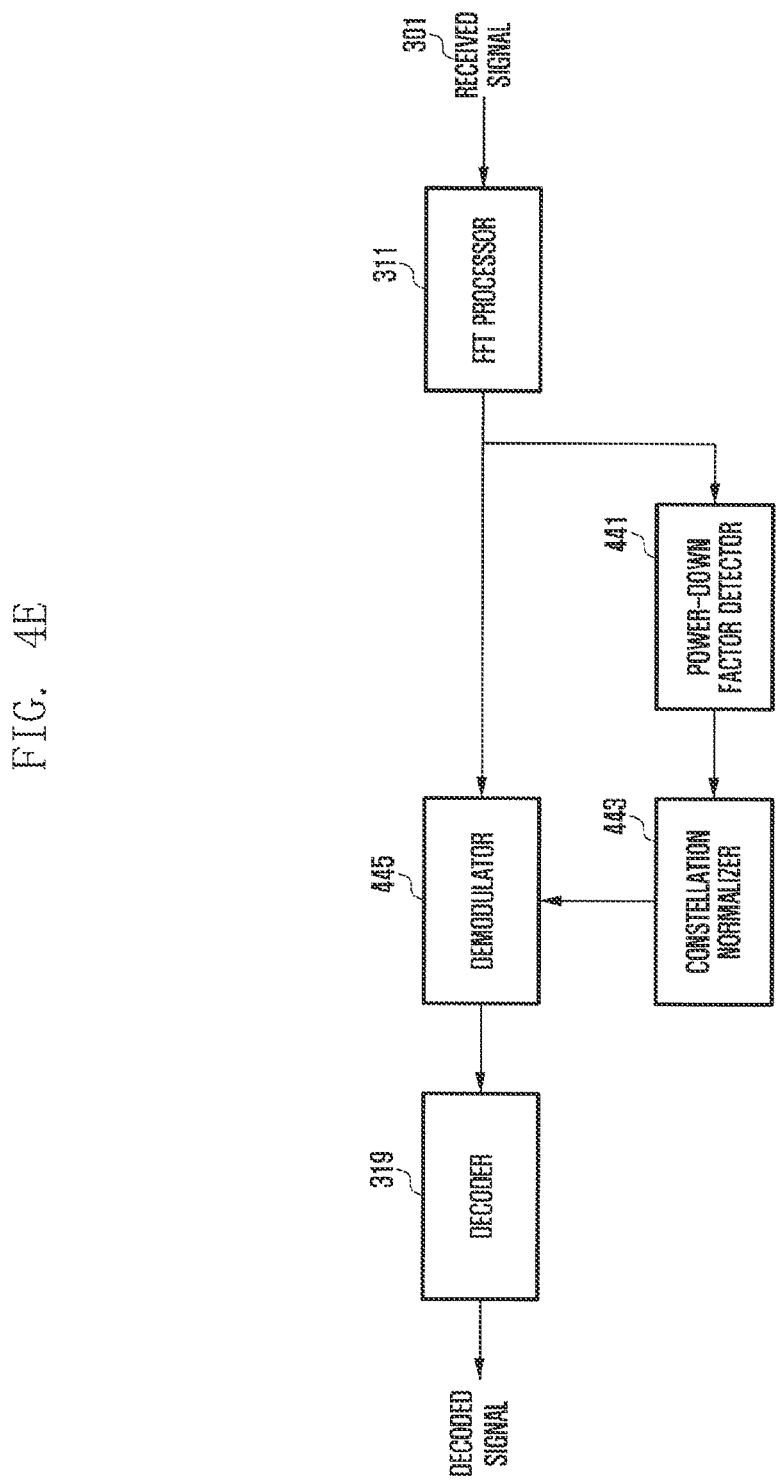

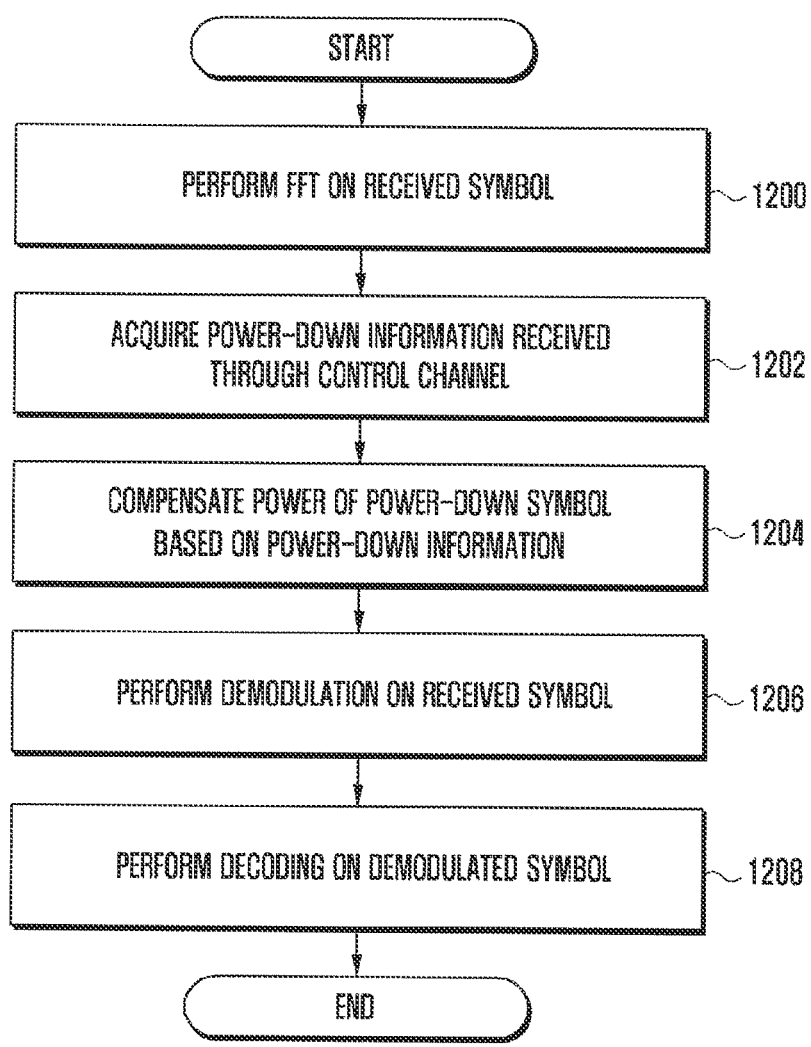

APPARATUS AND METHOD FOR DEMODULATING HYBRID MODULATION SYMBOL IN WIRELESS COMMUNICATION SYSTEM USING HYBRID MODULATION SCHEME

CROSS-REFERENCE TO RELATED APPLICATION AND CLAIM OF PRIORITY

The present application is related to and claims the benefit under 35 U.S.C. §119(a) of a Korean patent application filed on May 9, 2014, in the Korean Intellectual Property Office and assigned Serial No. 10-2014-0055372, the entire disclosure of which is hereby incorporated by reference.

TECHNICAL FIELD

The present disclosure relates to a modulation apparatus and method for use in a wireless communication system and, in particularly, to an apparatus and apparatus for demodulating a hybrid modulation symbol in a wireless communication using the hybrid modulation scheme.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a multi-cell wireless communication system, Gaussian assumption is applied on an interference signal to perform decoding at a low complexity. In the case of assuming Gaussian characteristic for the interference signal, a Quadrature Amplitude Modulation (QAM) series modulation scheme is used frequently to make the interference signal to the real transmission signal to have the Gaussian characteristic.

In consideration of the channel characteristics, however, it is preferred for the transmitter and receiver to use the non-Gaussian characteristic instead of the Gaussian characteristic to improve the decoding performance as well as throughput.

Recently, many studies are being conducted on the modulation scheme which gives the non-Gaussian characteristic to the interference signal for use in the wireless communication system. Frequency and Quadrature Amplitude Modulation (FQAM) is one of the representative modulation schemes resulted from such studies. The FQAM scheme is a hybrid modulation scheme developed by combining a QAM scheme and a Frequency Shift Keying (FSK) scheme. The FQAM scheme enjoys the advantage of QAM in terms of high spectral efficiency and the advantage of FSK in terms of giving non-Gaussian characteristic to the interference signal.

In the wireless communication system, if an interferer cell uses the FQAM scheme, the statistical characteristic of the interference signal shows non-Gaussian characteristic. Accordingly, in order to accomplish the performance expected with the FQAM scheme, it is necessary to transmit data in the modulation scheme negotiated among the neighboring base stations.

Meanwhile, the FQAM scheme has a characteristic in which power per tone is irregular. The powers for the individual tones constituting a symbol are concentrated on one tone. As a result, only one tone (active tone) boosted in power as much as the number of the tones constituting one symbol is transmitted but the rest tones carry nothing. Although, if a pilot signal of a neighbor cell exists in one of the rest tones carrying nothing, the data transmitted in FQAM scheme in the cell in which the receiver is located does not contaminate the pilot signal of the neighbor cell; if the pilot signal of the neighbor cell hits the tone carrying data (active tone), this may cause significant contamination to the pilot signal of the neighbor cell.

SUMMARY

To address the above-discussed deficiencies, it is a primary object to provide a signal demodulation method and apparatus of a receiver in a wireless communication system using a modulation scheme with non-Gaussian characteristics.

Also, the present disclosure provides a signal demodulation method and apparatus of a receiver that is capable of demodulating received signal reliably in a wireless communication system using a FQAM scheme.

In accordance with an aspect of the present disclosure, an apparatus of demodulating a modulation symbol received in a wireless communication system using a hybrid modulation scheme is provided. The apparatus includes a control channel receiver which acquires hybrid modulation scheme change information from control information received through a control channel, a constellation re-configurer which reconfigures a constellation diagram for use in demodulation with the hybrid modulation scheme change information provided by the control channel receiver, and a demodulator which demodulates a hybrid modulation symbol and a modified hybrid modulation symbol input when a reconfigured constellation diagram is received from the constellation re-configurer, based on the reconfigured constellation diagram.

In accordance with another aspect of the present disclosure, an apparatus of demodulating a modulation symbol received in a wireless communication system using a hybrid modulation scheme is provided. The apparatus includes a control channel receiver which acquires hybrid modulation scheme power-down information and information on a position of a symbol to which power-down is applied from control information received through a control channel, a power compensator which compensates power for the power-down amount at the position of the symbol to which power-down is applied which is notified by the control channel receiver, and a demodulator which demodulates the received symbol modulated in the hybrid modulation scheme.

In accordance with another aspect of the present disclosure, a method of demodulating a modulation symbol received in a wireless communication system using a hybrid modulation scheme is provided. The method includes acquiring hybrid modulation scheme change information from control information received through a control channel, reconfiguring a constellation diagram for use in demodulation with the hybrid modulation scheme change information, and demodulating a hybrid modulation symbol and a modified hybrid modulation symbol input when a reconfigured constellation diagram is received, based on the reconfigured constellation diagram.

In accordance with still another aspect of the present disclosure, a method of demodulating a modulation symbol received in a wireless communication system using a hybrid modulation scheme is provided. The method includes acquiring hybrid modulation scheme power-down information and information on a position of a symbol to which power-down is applied from control information received through a control channel, compensating power for the power-down amount at the position of the symbol to which power-down is applied, and demodulating the received symbol modulated in the hybrid modulation scheme.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4E illustrates a configuration of the receiver for processing received data based on only the power-down factor provided by the transmitter according to various embodiments of the present disclosure;

FIG. 5B illustrates indices indicating tones carrying data in the transmission mode of transmitting data using two tones according to various embodiments of the present disclosure;

FIG. 12 illustrates a power-down recovery procedure of the receiver according to various embodiments of the present disclosure.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Exemplary embodiments of the present disclosure are described with reference to the accompanying drawings in detail. The same reference numbers are used throughout the drawings to refer to the same or like parts. The drawings are provided to help understanding the present disclosure but not intended to be limiting the present disclosure in shape and arrangement. Detailed description of well-known functions and structures incorporated herein may be omitted to avoid obscuring the subject matter of the present disclosure. In the following, descriptions are made of only the parts necessary for understanding the operations in accordance with various embodiments of the present disclosure but not the other parts to avoid obscuring the subject matter of the present disclosure.

Further, the following terms are defined in consideration of the functionality in the present disclosure, and may vary according to the intention of a user or an operator, usage, etc. Therefore, the definition should be made on the basis of the overall content of the present specification.

Figure 1:
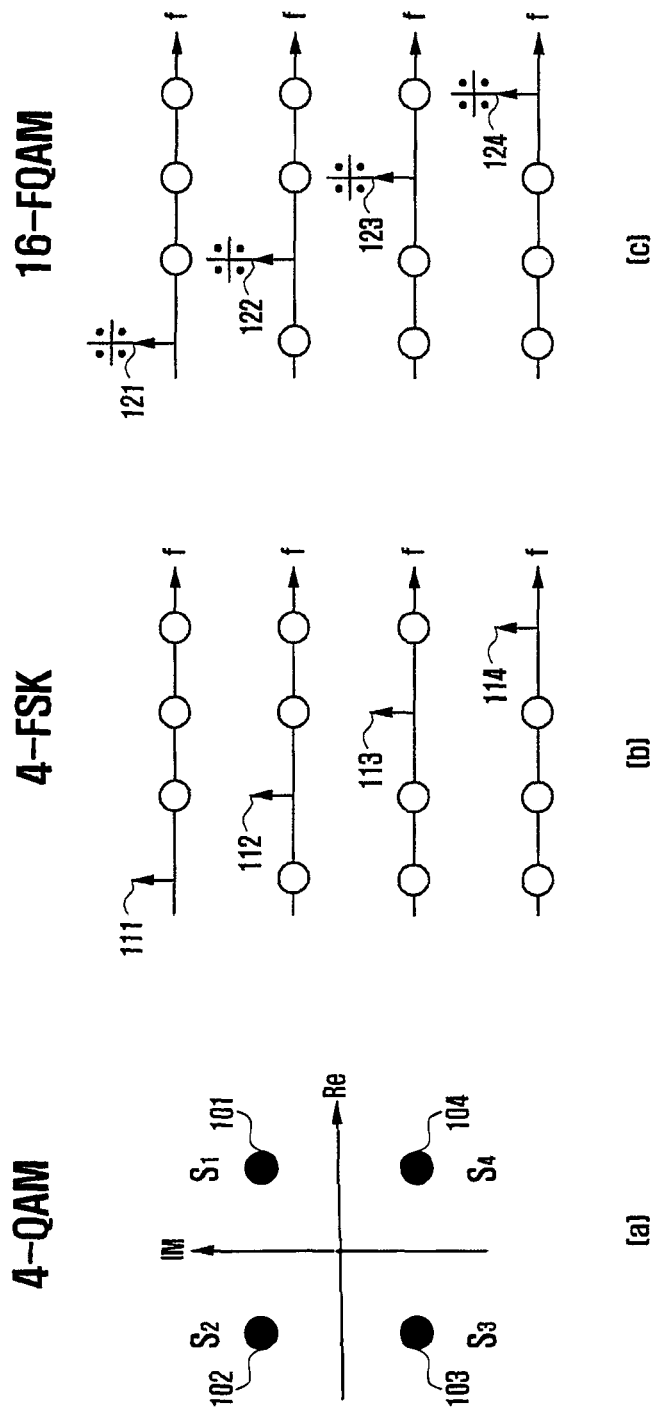
FIG. 1 illustrates a FQAM scheme with non-Gaussian characteristics according to various embodiments of the present disclosure.

FIG. 1 illustrates a FQAM scheme with non-Gaussian characteristics according to various embodiments of the present disclosure.

Parts (a), (b), and (c) of FIG. 1 show three different modulation schemes respectively. Referring to FIG. 1, part (a) shows the constellation with four coordinates 101, 102, 103, and 104 for mapping data thereto in 4-QAM scheme. In the 4-QAM scheme, the data to be transmitted is mapped to the coordinates of $S_1$ 101, $S_2$ 102, $S_3$ 103, and $S_4$ 104 on the Real (Re) axis and Imaginary (Im) axis as shown in part (a) of FIG. 1. In the 4-FSK scheme as shown in part (b) of FIG. 1, the data to be transmitted is mapped to four different frequency bands 111, 112, 113, and 114. For example, the data may be mapped to different frequency bands 111, 112, 113, and 114.

Part (c) of FIG. 1 shows the FQAM scheme with non-Gaussian characteristics, which is a hybrid modulation scheme combining the 4-QAM scheme of part (a) of FIG. 1 and the 4-FSK scheme of part (b) of FIG. 1. When combining the 4-QAM and 4-FSK schemes and mapping data as shown in part (c) of FIG. 1, the interference signal has non-Gaussian characteristics as in the FSK schemes. The 16-FQAM scheme exemplified in part (c) of FIG. 1 shows an exemplary case of mapping data to the forms 121, 122, 123, and 124 in the 4-QAM scheme on the respective frequency bands. The FQAM scheme is capable of improving the spectral efficiency as compared to the FSK modulation schemes by applying the QAM and FSK schemes simultaneously.

As described above, the FQAM scheme is a hybrid modulation scheme. In the following description, the terms 'hybrid modulation scheme' and 'FQAM scheme' are used interchangeably.

Figure 2A:
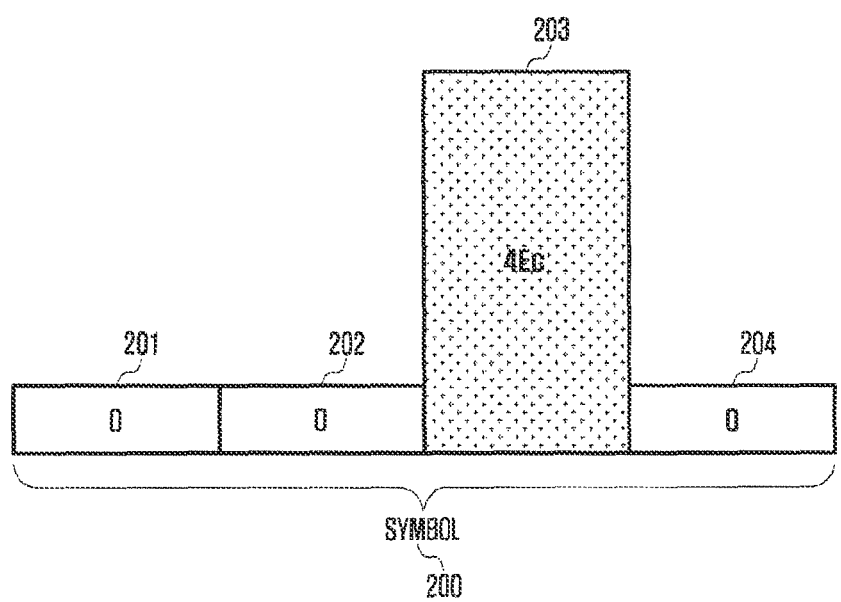
FIG. 2A illustrates a power state at a tone carrying data in a symbol transmitted in the FQAM scheme according to various embodiments of the present disclosure.

FIG. 2A illustrates a power state at a tone carrying data in a symbol transmitted in the FQAM scheme.

FIG. 2A shows an exemplary case where a symbol 200 consists of four tones 201, 202, 203, and 204. When generating one symbol 200, it is possible to use four different tones 201, 202, 203, and 204 as shown in FIG. 2A. In another exemplary case, a symbol may consist of three or five tones. The number of tones constituting a symbol is determined depending on the symbol generation scheme of the wireless communication system. FIG. 2A exemplifies the case where the symbol 200 consists of 4 tones 201, 202, 203, and 204.

As shown in FIG. 2A, one symbol 200 consists of four different tones 201, 202, 203, and 204; and among them, the third tone 203 carries data while the other three tones carry nothing. In certain embodiments, the transmit power is concentrated on the tone carrying the data.

For example, when all of the tones 201, 202, 203, and 204 carry data, every tone is allocated the transmit power of Ec. Otherwise, when only one tone carries data in the FQAM scheme as shown in FIG. 2A, the sum of the distributed transmit powers, i.e. 4Ec, is concentrated on the third tone 203 carrying the data.

When boosting the transmit power of one tone in this way, this may cause interference to neighboring communication areas, e.g. neighbor cells. This situation is exemplified hereinafter. When the transmission timing of the data-carrying tone hits the transmission timing of a pilot tone of the neighboring tone, this is likely to cause significant interference (contamination) to the pilot signal of the neighbor cell. There is therefore a need of a method for receiving data at the receiver without such interference. Various embodiments of such methods are described hereinafter.

In the following description, the transmitter uses the hybrid modulation scheme. In the following, the description is made of the configurations and operations of the receivers in the cases where the original hybrid modulation scheme is applied and the hybrid modulation scheme is modified at a specific part, e.g. the position of the pilot symbol of the neighbor cell.

<First Embodiment>

The first embodiment of the present disclosure is directed to a method of transmitting data in the FQAM scheme as a hybrid modulation scheme that is capable of mitigating interference at the pilot position of a neighbor cell by applying power down to the symbol at the corresponding position.

Figure 2B:
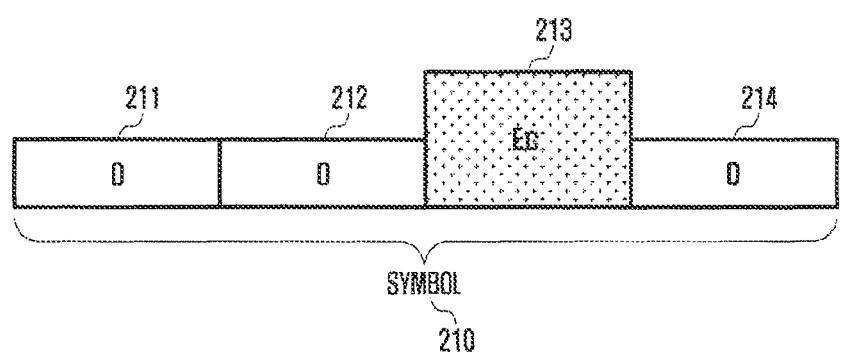
FIG. 2B illustrates a power-down at the tone carrying data in a symbol transmitted in the FQAM scheme to mitigate interference at a pilot position of a neighbor cell according to various embodiments of the present disclosure.

FIG. 2B illustrates a power-down at the tone carrying data in a symbol transmitted in the FQAM scheme to mitigate interference at a pilot position of a neighbor cell according to the first embodiment of the present disclosure.

Referring to FIG. 2B, a symbol 210 consists of four tones 211, 212, 213, and 214 like the symbol of FIG. 2A. The tones 211, 212, and 214 not carrying data are not allocated transmit power. The transmit power is allocated to the third tone 213 carrying data.

Comparing FIGS. 2A and 2B, the transmit power at the tone 213, carrying data in FIG. 2B, is reduced as compared to the tone 203 of FIG. 2A. FIG. 2B exemplifies the transmit power of the tone 213 is Ec, which is one fourth of the transmit power of the tone 203 in FIG. 2A. However, the power-down at the tone 213 carrying data is not limited to a one fourth of the transmit power when FIG. 2A. For example, it is also possible to allocate the transmit power of 2Ec or 3Ec to the third tone 213. When using the power-down mode at the tone carrying data in the system operating with the FQAM scheme, it is necessary for the receiver to be aware thereof.

Accordingly, the receiver is configured in correspondence to the information provided by the transmitter when using the power-down mode according to the first embodiment. Descriptions are made of the information provided by the transmitter hereinafter. In the following description, the information on the power-down amount is referred to as power-down factor.

First, the transmitter provides the receiver with the information on the power-down position and power down factor when the power-down is applied to the whole symbol or a specific position in the symbol.

Second, the transmitter provides the receiver with only the information on the power-down position in the symbol. The transmitter may provide the receiver with predetermined power-down factors, e.g. available power-down values.

Third, the transmitter provides the receiver with only the pilot position of the neighbor cell. The transmitter provides the receiver with predetermined power-down factors, e.g. available power-down values.

Fourth, the transmitter provides the receiver with only the information on whether the power-down mode is applied.

Fifth, the transmitter provides the receiver with the information on pilot position and the power-down factor when the power-down is applied to the whole symbol or a specific position of the symbol.

Sixth, the transmitter provides the receiver with only the power-down factor when the power-down is applied to the whole symbol or a specific position of the symbol.

When the transmitter uses the hybrid modulation scheme to generate a hybrid modulation symbol in the first method, it is possible to apply the power-down mode to the whole symbol or a specific position of the symbol. Descriptions are made of the configurations and operations of the receivers that are appropriate when the transmitter provides the receiver with the information on the power-down position and power-down factor information hereinafter.

Figure 3A:
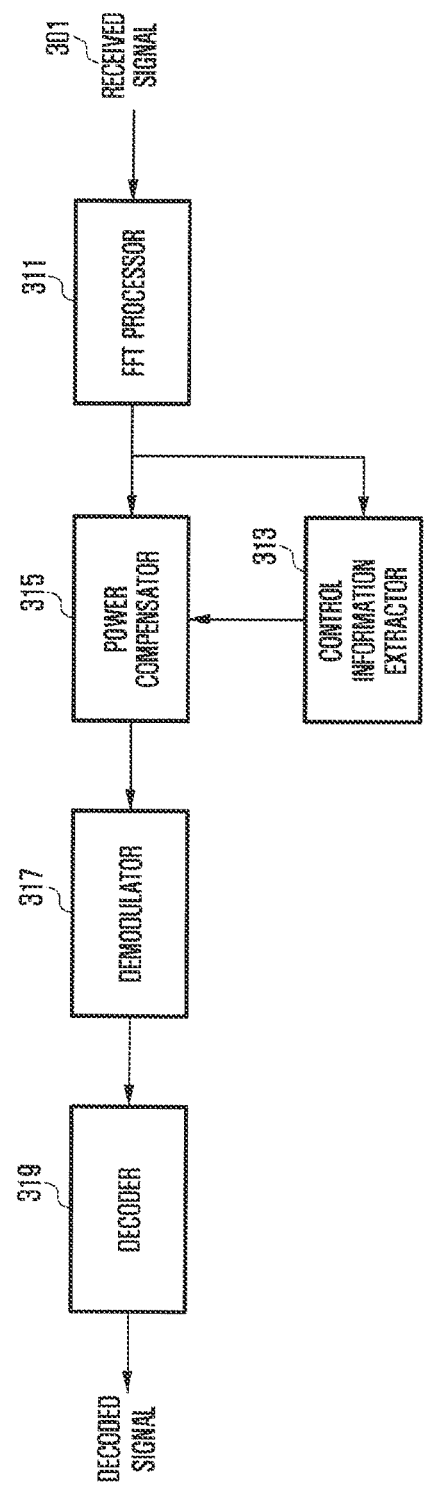
FIGS. 3A and 3B illustrate configurations of a receiver for processing a signal transmitted by a transmitter which provides power-down factor and position information according to various embodiments of the present disclosure.
Figure 3B:
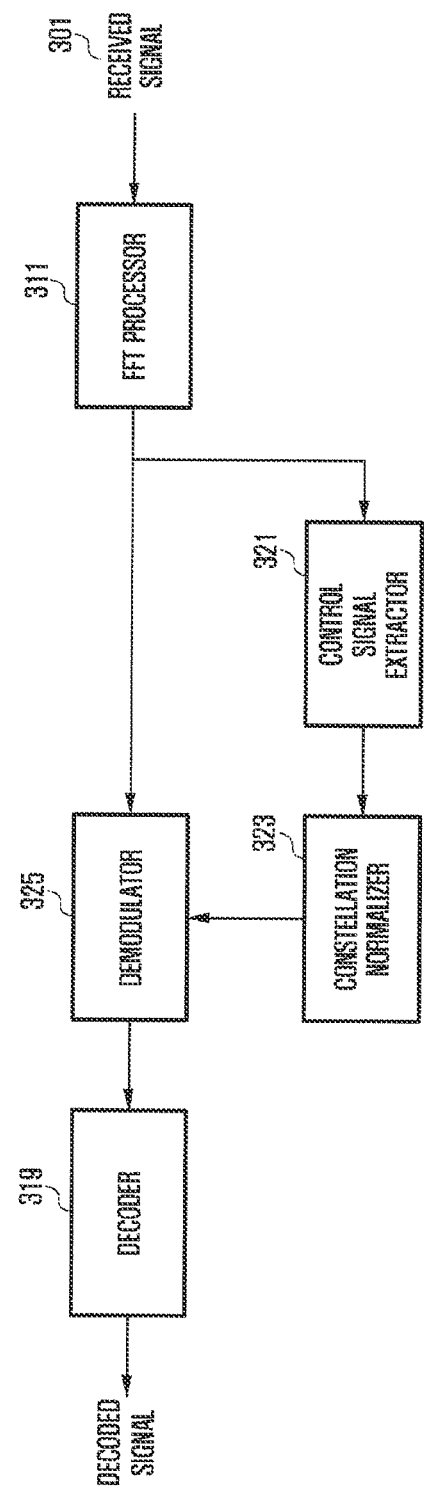

FIGS. 3A and 3B illustrate configurations of a receiver for processing a signal transmitted by a transmitter which provides power-down factor and position information according to the first embodiment of the present disclosure.

Referring to FIG. 3A, the received signal 301 is input to a Fast Fourier Transform (FFT) processor 311. The FFT processor 311 processes the received signal 301 to output discrete frequency signals. Among the output signals, the control signal is input to a control information extractor 313, while the data signal is input to a power compensator 315. Then the data signal is input to a demodulator 317. The control signal is transmitted through a channel different in time or frequency from that of the data signal or as inserted at a specific position of the data signal. All the cases are available in the present disclosure without restriction.

The control information extractor 313 extracts the power-down factor and power-down position information in the symbol transmitted by the transmitter. The power-down factor and power-down position information is provided to the power compensator 315.

The power compensator 315 receives the data signal from the FFT processor 311 and the power-down factor and power-down position information from the control information extractor 313. The power compensator 315 compensates the power at the power-down position of the symbol. For example, the power-down factor at the power-down position is one fourth, the power compensator 315 compensates the power at the power-down position as much as 4 folds as shown in FIG. 2B.

The symbol compensated in power by the power compensator 315 can be modulated by a demodulator 317 normally. The signal demodulated by the demodulator 317 is decoded by the decoder 319 so as to be output as decoded data.

When the transmitter informs the receiver of the power-down position and power-down factor of the symbol, the receiver compensates the power at the corresponding position based on power-down position and power-down factor information so as to perform demodulation and decoding on the received data normally as shown in FIG. 3A.

When using the receiver as shown in FIG. 3A, the transmitter is capable of transmitting the symbol designed as shown in FIG. 2B so as to mitigate interference (contamination) to the neighbor cell at a specific power-boosted tone.

FIG. 3B shows the configuration of the receiver for processing the FQAM symbol transmitted by the transmitter which provides the power-down factor and power-down position in the FQAM symbol. When the symbol as shown in FIG. 2B is transmitted, the receiver has to know the tone (active tone) carrying FQAM data to which power-down is applied in the code frame.

Referring to FIG. 3B, the received signal 301 is input to a Fast Fourier Transform (FFT) processor 311. The FFT processor 311 processes the received signal 301 to output discrete frequency signals. Among the output signals, the control signal is input to a control information extractor 321 while the data signal is input to a demodulator 325. Among the discrete frequency signals, the data signal is input to the demodulator 325. The control signal is transmitted through a channel different in time or frequency from that of the data signal or as inserted at a specific position of the data signal. All the cases are available in the present disclosure without restriction.

The control information extractor 313 extracts the power-down factor and power-down position information transmitted by the transmitter. The power-down factor and power-down position information are sent to a constellation normalizer 323.

The constellation normalizer 323 receives the power-down position and power-down factor provided by the control information extractor 313 and provides a normalized constellation diagram for use in demodulation at the corresponding position of the symbol. The constellation normalizer 323 normalizes the constellation diagram for the symbol transmitted in the power-down mode such that the demodulator 325 and the decoder 319 perform demodulation and decoding normally.

When the 4-QAM scheme as shown in part (a) of FIG. 1, data is mapped to one of four quadrants in the coordinate plane with the real and imaginary axes, each quadrant having one coordinate pair. When using the 16-QAM scheme, each quadrant has four coordinate pairs. Assuming four coordinate pairs representing $S_{11}$, $S_{12}$, $S_{13}$, and $S_{14}$ in a quadrant formed by the real (Re) axis of x and the imaginary (Im) axis of y, the coordinates of a symbol can be expressed as follows.

The coordinates of $S_{11}$ are $(x_1, y_1)$, the coordinates of $S_{12}$ are $(x_1, y_2)$, the coordinates of $S_{13}$ are $(x_2, y_1)$, and the coordinates of $S_{14}$ are $(x_2, y_2)$. The transmitter maps data to a specific coordinate pair in one of the quadrants and then the receiver matches the received signal to the closest coordinate pairs on the real and imaginary axes to make a decision on transmitted data.

When the transmitter transmits the data at the transmit power reduced as shown in FIG. 2B, it is impossible to map the data to a coordinate pair. There is therefore a need of normalizing the coordinate pairs on the constellation diagram in consideration of the power-down. The constellation normalizer 323 normalizes the constellation diagram based on the power-down value, i.e. power-down factor, to adjust the coordinate pairs to which the normal data are mapped. When reducing the transmit power required to transmit the symbol as shown in FIG. 2A to the power level as shown in FIG. 2B, the transmitter notifies the receiver that the power-down factor is one fourth. Accordingly, the constellation normalizer 323 normalizes the constellation diagram to apply the power-down to one fourth such that the demodulator 325 uses the normalized constellation diagram in demodulating the corresponding symbol.

The demodulator 325 performs demodulation on the power-down symbol of the data output from the FFT processor 311 based on the normalized constellation diagram and the power-down position information provided by the constellation normalizer. The demodulator 325 also performs normal demodulation on the symbol to which no power-down is applied. The decoder 319 decodes the demodulated signal to output the decoded data.

When the transmitter sends the receiver the power-down position and power-down factor information, the receiver normalizes the constellation diagram to be used in demodulation at the corresponding position based on the power-down factor and applies the normalizes constellation diagram in demodulation of the corresponding symbol as shown in FIG. 3B. As a consequence, the decoder 319 is capable of decoding the signal normally afterward.

When using the receiver as shown in FIG. 3B, the transmitter transmits the symbol designed as shown in FIG. 2B so as to mitigate interference (contamination) to the neighbor cell pilot signal which is caused by the power-boost at a specific tone.

Descriptions are made of the configurations and operations of the receivers that are appropriate when the transmitter provides the receiver with only the information on the power-down position of the FQAM symbol hereinafter.

Figure 4A:
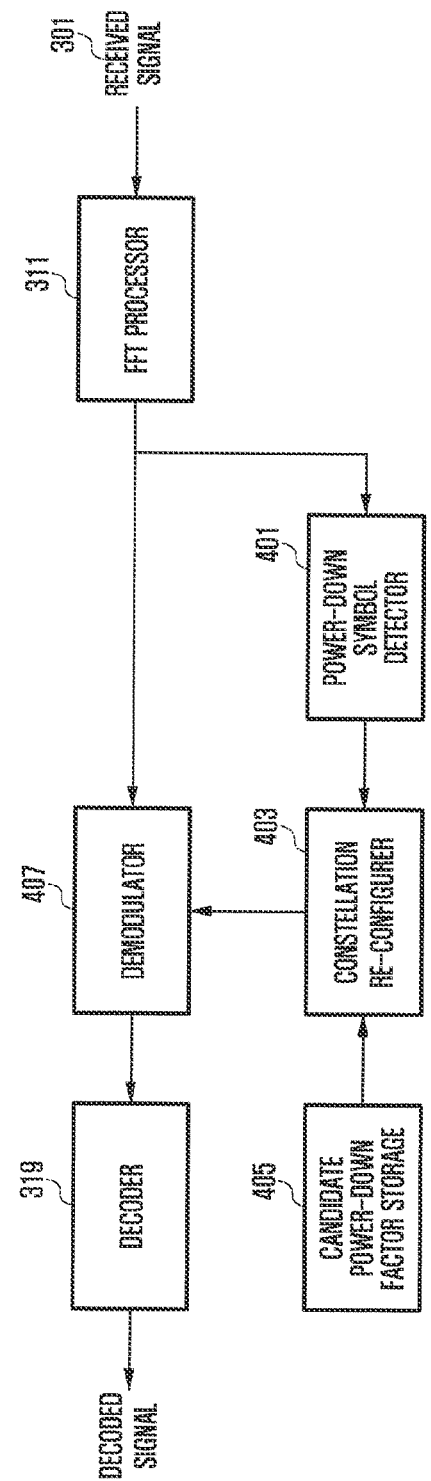
FIG. 4A illustrates a configuration of the receiver for processing received data transmitted by a transmitter according to various embodiments of the present disclosure.

FIG. 4A illustrates a configuration of the receiver for processing received data transmitted by a transmitter according to the first embodiment of the present disclosure.

Referring to FIG. 4A, the received signal 301 is input to a Fast Fourier Transform (FFT) processor 311. The FFT processor 311 processes the received signal 301 to output discrete frequency signals. Among the output signals, the control signal is input to a power-down symbol detector 401. The data signal among the output signals from the FFT processor 311 is input to a demodulator 407. The control signal is transmitted through a channel different in time or frequency from that of the data signal or as inserted at a specific position of the data signal. All the cases are available in the present disclosure without restriction.

The power-down symbol detector 401 analyzes the control signal to detect the power-down symbol position. The power-down symbol detector 401 outputs the information on the position of the power-down symbol to a constellation re-configurer 403.

The candidate power-down factor storage 405 is a memory for storing the values of the power-down factors predetermined in negotiation with the transmitter. When different power-down factors are used by the respective transmitters, the corresponding transmitter has to provide the receiver with available power-down factors. The receiver receives the power-down factors transmitted by the transmitter and stores the power-down factors in the candidate power-down factor storage 405. When different power-down factors are used by the respective transmitters, the candidate power-down factor storage 405 is configured to make it possible to read and write. When the type of the power-down factor is predefined in the wireless communication system, the candidate power-down factor storage 405 stores the power-down factor configured at the manufacturing stage of the receiver.

For examples, the power-down factors stored in the candidate power-down factor storage 405 includes an original state factor of one, a power-down factor of one half, a power-down factor of one fourth, and a power-down factor of one eighth. The power-down factors are not limited to aforementioned values but include various values without limitation. The candidate power-down factor storage 405 provides the constellation re-configurer 403 with the stored values.

The constellation re-configurer 403 receives the power-down factors and outputs the constellation diagrams corresponding to the received power-down factors to the demodulator 407. The constellation diagrams reconfigured by the constellation re-configurer 403 are provided in synchronization with the power-down symbol position. Suppose that a series of symbols are received in the order of " . . . , N−2, N−1, N, N+1, N+2, . . . " and the power-down symbol detector 401 detects the $N^{th}$ symbol as the power-down symbol. Then the constellation re-configurer 403 provides the demodulator 407 with the reconfigured constellation diagram at the time of demodulating the $N^{th}$ symbol.

A description is made of the method of reconfiguring the constellation hereinafter. The constellation re-configurer 403 generates power-down constellation diagrams corresponding to the respective power-down factors provided by the candidate power-down factor storage 405. This can be achieved with the same method as the constellation diagram normalization as described above with reference to FIG. 3B. When the three candidate power-down factors of one half, one fourth, and one eighth are given, the constellation re-configurer 403 generates three different constellation diagrams to the demodulator 407. When the constellation re-configurer 403 provides the reconfigured constellation diagrams along with the original constellation diagram, four different constellation diagrams are provided.

The constellation re-configurer 403 changes the power-down factor when the modulation scheme changes. For example, assuming that 16-FQAM, 32-FQAM, 64-FQAM schemes are available, the constellation re-configurer 403 generates four different constellation diagrams corresponding to the respective modulation schemes. With M modulation schemes and N power-down factors, the constellation re-configurer 403 generates M×(N+1) constellation diagrams. In certain embodiments, the total number of power-down factors is N+1 because the original constellation diagram should be counted in.

However, the constellation re-configurer 403 may not provide the demodulator 407 with all the M×(N+1) constellations diagrams at a time, because a certain system includes a predetermined modulation order. When the constellation re-configurer 403 is capable of being aware of the modulation order of the transmitter in advance, it provides the modulator 407 with the constellation diagrams corresponding to the power-down factors matching the corresponding modulation order.

The demodulator 407 performs demodulation on the data signal from the FFT processor 311 using the constellation diagrams provided by the constellation re-configurer 403. Afterward, the decoder 319 performs decoding on the demodulated signal normally.

When using the receiver as shown in FIG. 4A, the transmitter is capable of transmitting the symbol designed as shown in FIG. 2B so as to mitigate interference (contamination) to the neighbor cell pilot signal that is caused by the power boosted at a specific tone.

Descriptions are made of the configuration and operation of the receiver which is appropriate when the transmitter provides the receiver with the information on the pilot position in consideration of the power-down hereinafter.

Figure 4B:
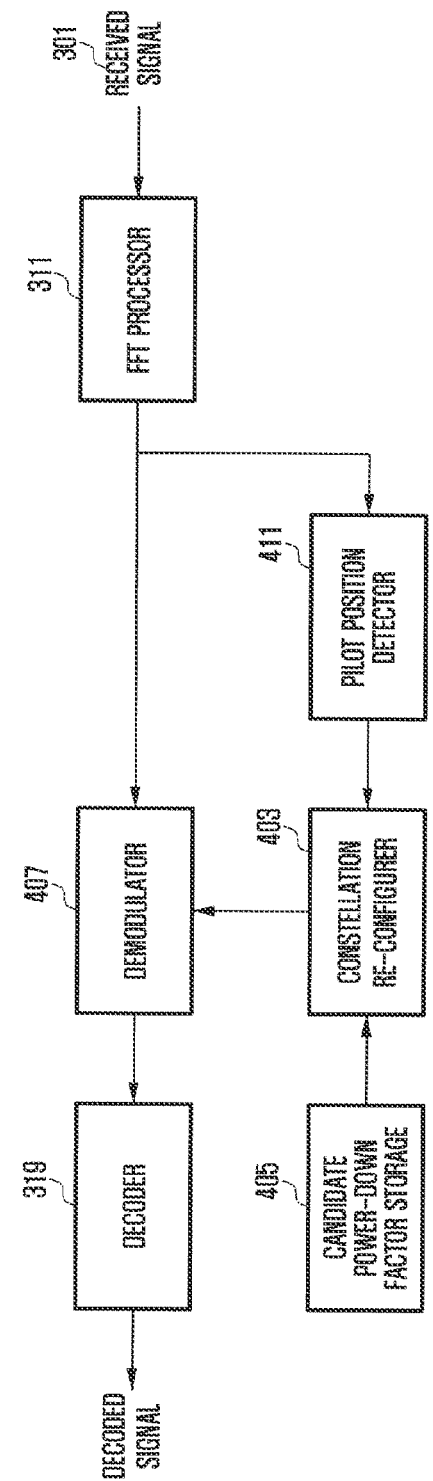
FIG. 4B illustrates a configuration of the receiver for processing received data based on the neighbor cell pilot position information provided by the transmitter according to various embodiments of the present disclosure.

FIG. 4B illustrates a configuration of the receiver for processing received data based on the neighbor cell pilot position information provided by the transmitter according to the first embodiment of the present disclosure.

Referring to FIG. 4B, the received signal 301 is input to a Fast Fourier Transform (FFT) processor 311. The FFT processor 311 processes the received signal 301 to output discrete frequency signals. Among the output signals, the control signal is input to a pilot position detector 411. The data signal among the output signals from the FFT processor 311 is input to a demodulator 407. The control signal is transmitted through a channel different in time or frequency from that of the data signal or as inserted at a specific position of the data signal. All the cases are available in the present disclosure without restriction.

The pilot position detector 411 detects the positions of pilot signals considered for power-down by analyzing the control signal. The positions of the pilot signals are the pilot positions of the neighbor cells. When there are three neighbor cells around the serving cell of the receiver, the transmitter transmits data by applying power-down to the whole symbol carrying the data or a specific tone of the symbol which is likely to affect the pilot signals of the neighbor cells. The transmitter applies one of predetermined power-down factors.

When the transmitter performs power-down in consideration of the pilot signals of the neighbor cells, it transmits the pilot position information to the receiver. Although the power-down is considered at the transmitter, the power-down may not be applied at the corresponding symbol, because the position of the pilot tone varies in every symbol and interference may not occur to the neighbor cell even without applying the power-down of the transmit power between the transmitter and receiver.

Accordingly, the pilot position detector 411 analyzes the control signal transmitted by the transmitter to check the pilot position considered for power-down in data transmission of the transmitter. When the pilot position for power-down is detected, the pilot position detector 411 provides the constellation re-configurer 403 with the information on the pilot position for power-down.

The candidate power-down factor storage 405 is a memory for storing the values of the power-down factors predetermined in negotiation with the transmitter. The candidate power-down factor storage 405 includes the same configuration as described with reference to FIG. 4A. The candidate power-down factor storage 405 provides the constellation re-configurer 403 with the candidate power-down factor values. Detailed description thereof is omitted to avoid unnecessary repetition.

The constellation re-configurer 403 receives the power-down factors and outputs the constellation diagrams reconfigured in correspondence to the respective power-down factors to the demodulator 407. The reconfigured constellation diagrams are provided in synchronization with the pilot positions detected by the pilot position detector 411. When a series of symbols are received in the order of " . . . , N−2, N−1, N, N+1, N+2, . . . " and the pilot position detector 411 detects the $N^{th}$ symbol as the pilot symbol. Then the constellation re-configurer 403 provides the demodulator 407 with the reconfigured constellation diagrams at the time of demodulating the $N^{th}$ symbol.

Since the constellation re-configurer reconfigures the constellation diagram has been described with reference to FIGS. 3B and 4A, detailed description thereof is omitted to avoid unnecessary repetition. As described above, the number of constellation diagrams that the constellation generator 403 provides to the demodulator 407 is N+1 and are determined depending on the number of modulation schemes and the number of power-down factors. The constellation re-configurer 403 may not provide the demodulator with all the M×(N+1) constellation diagrams at a time, because a certain system includes a predetermined modulation order. Accordingly, when the constellation re-configurer 403 is capable of being aware of the modulation order of the transmitter in advance, it provides the demodulator 407 with the constellation diagrams corresponding to the power-down factors matching the corresponding modulation orders.

The demodulator 407 performs demodulation on the data signal from the FFT processor 311 using the constellation diagrams provided by the constellation re-configurer 403. At this time, since the power-down is applied or not at the pilot position, the demodulator 407 tries demodulation using the original constellation diagram and the constellation diagrams reconfigured based on the power-down factors. Afterward, the decoder 319 performs decoding on the demodulated signal normally.

When using the receiver as shown in FIG. 4B, the transmitter is capable of transmitting the symbol with the power-down in consideration of the pilot signals of the neighbor cells as designed as shown in FIG. 2B so as to mitigate interference (contamination) to the neighbor cell pilot signal which is caused by the power boosted at a specific tone.

Descriptions are made of the configuration and operation of the receiver which is appropriate when the transmitter provides the receiver with only the information on whether the power-down mode is used or not hereinafter.

Figure 4C:
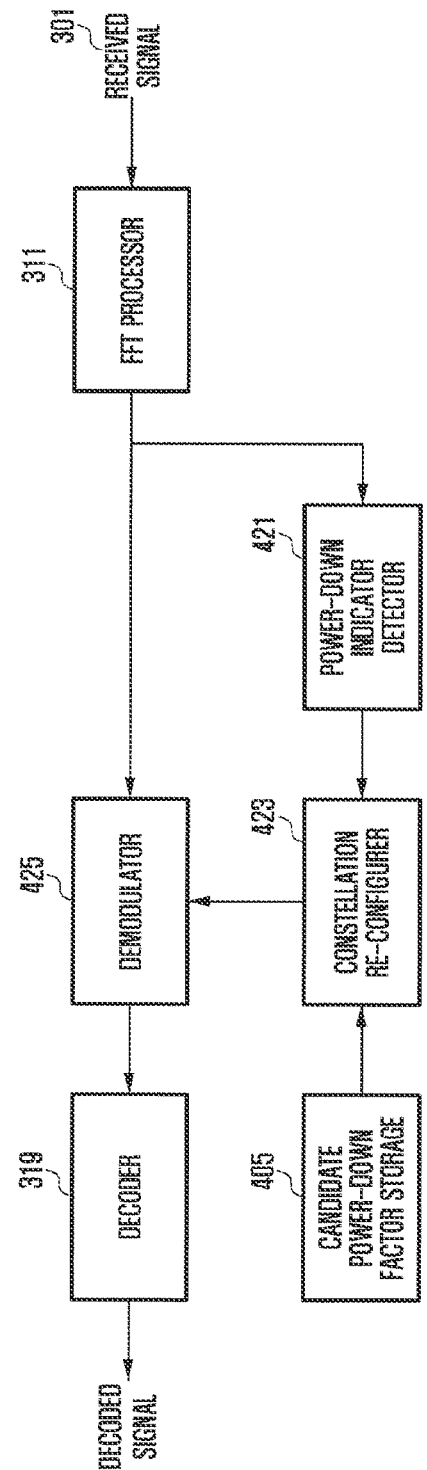
FIG. 4C illustrates a configuration of the receiver for processing received data based on the information on whether the transmitter uses the power-down mode which is applied by the transmitter according to various embodiments of the present disclosure.

FIG. 4C illustrates a configuration of the receiver for processing received data based on the information on whether the transmitter uses the power-down mode that is applied by the transmitter according to the first embodiment of the present disclosure.

When the receiver is configured as shown in FIG. 4C, the transmitter is capable of using the power-down mode optionally and, when using the power down function, notifies the receiver that it uses the power-down mode.

Referring to FIG. 4C, the received signal 301 is input to a Fast Fourier Transform (FFT) processor 311. The FFT processor 311 processes the received signal 301 to output discrete frequency signals. Among the output signals, the control signal is input to a power-down indicator detector 411. The data signal from the FFT processor 311 is input to a demodulator 425. The control signal is transmitted through a channel different in time or frequency from that of the data signal or as inserted at a specific position of the data signal. All the cases are available in the present disclosure without restriction.

The power-down indicator detector 421 analyzes the control signal to check whether the power-down mode is used. The information on whether the power-down mode is used can be indicated with one bit or in association with other control's information. The power-down indicator detector 421 generates the information on whether the power-down mode is used to the constellation re-configurer 423.

In certain embodiments, although the transmitter uses the power-down mode, the receiver does not know the exact power-down position. The constellation re-configurer 423 operates depending on whether the power-down mode is used. For example, when the power-down mode is not used, it is not necessary for the constellation re-configurer 423 to operate. When the power-down mode is used, the constellation re-configurer 423 provides the constellation diagrams corresponding to the respective power-down levels for all the received symbols. Accordingly, the power down indicator detector 421 controls to turn on or off the constellation re-configurer 423 and to provide, when it allows to provide the original constellation diagram, the original constellation diagram.

The candidate power-down factor storage 405 is a memory for storing the values of the power-down factors predetermined in negotiation with the transmitter. The candidate power-down factor storage 405 includes the same configuration as described with reference to FIG. 4A. The candidate power-down factor storage 405 provides the constellation re-configurer 423 with the candidate power-down factor values. Detailed description thereof is omitted to avoid unnecessary repetition.

The constellation re-configurer 423 receives a power down indicator and reconfigures, when the power down indicator indicates use of power-down, the constellation diagram and, otherwise, skips reconfiguring the constellation diagram. When power-down is indicated, the constellation re-configurer 423 provides reconfigured constellation diagrams continuously while receiving data symbols. The number of reconfigured constellation diagrams is "N+1." The constellation re-configurer 403 may not provide the demodulator 425 with all of M×(N+1) reconfigured constellation diagrams at a time, because a certain system includes a predetermined modulation order. Accordingly, when the constellation re-configurer 423 is capable of being aware of the modulation order of the transmitter in advance, it provides the demodulator 425 with the constellation diagrams corresponding to the power-down factors matching the corresponding modulation orders. Since the constellation reconfiguration method has been described above, detailed description thereof is omitted herein.

The demodulator 425 performs demodulation on the data signal from the FFT processor 311 using the constellation diagrams provided by the constellation re-configurer 423. When a reconfigured constellation diagram is not provided or when only the original constellation diagram is provided by the constellation generator, the demodulator 425 performs demodulation only without the provided constellation diagram. Otherwise, when at least one reconfigured constellation diagram is provided by the constellation re-configurer 423, the demodulator 425 performs demodulation on the received data symbols using all of the received constellation diagrams. The decoder 319 performs decoding on the demodulated signal normally.

When the receiver is configured as shown in FIG. 4C, the transmitter notifies the receiver only whether it uses the power-down mode when it uses the power-down mode and transmits the power-down symbol as shown in FIG. 2B. When using the receiver as shown in FIG. 4C, it is possible to mitigate interference (contamination) to the neighbor cell pilot signal that is caused by the power boosted at a specific tone.

Descriptions are made of the configuration and operation of the receiver which is appropriate when the transmitter provides the receiver with the information on the pilot position of the neighbor cell and the power-down factor for the power-down applied to the whole symbol or a specific position of the symbol.

Figure 4D:
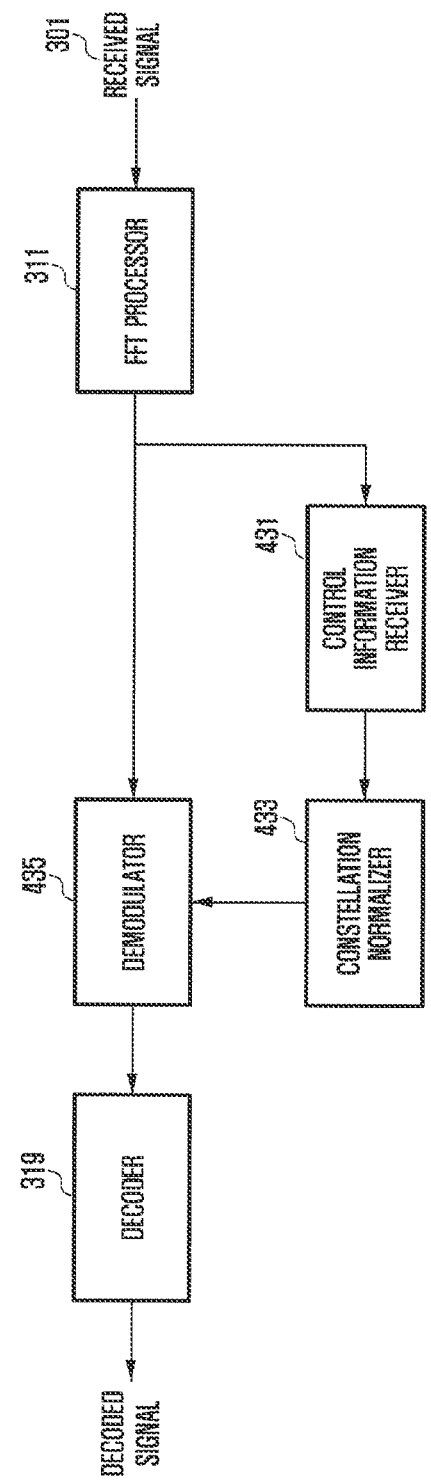
FIG. 4D illustrates a configuration of the receiver for processing received data based on the information on the pilot position of the neighbor cell and power-down factor which is provided by the transmitter according to various embodiments of the present disclosure.

FIG. 4D illustrates a configuration of the receiver for processing received data based on the information on the pilot position of the neighbor cell and power-down factor which is provided by the transmitter according to the first embodiment of the present disclosure.

Referring to FIG. 4D, the received signal 301 is input to a Fast Fourier Transform (FFT) processor 311. The FFT processor 311 processes the received signal 301 to output discrete frequency signals. Among the output signals, the control signal is input to a control information receiver 431. The data signal from the FFT processor 311 is input to a demodulator 435. The control signal is transmitted through a channel different in time or frequency from that of the data signal or as inserted at a specific position of the data signal. All the cases are available in the present disclosure without restriction.

The control information receiver 431 receives the neighbor cell pilot position information and power-down factor information through a control channel or a predetermined channel. The neighbor cell pilot position information includes pilot positions of two or more cells. When the neighbor cell pilot symbol position information is received, a power-down symbol is transmitted at the same position at the pilot symbol position of the neighbor cell. However, this may not mean that the power-down factor is applied to the pilot symbol position of the neighbor cell, because power-down is not applied when the tone carrying the pilot signal in the pilot symbol of the neighbor cell differs in position from the tone carrying the data in the data symbol of the serving cell of the receiver.

The control information receiver 431 receives power-down factor information along with the pilot position information of the neighbor cell. The control information receiver 431 provides the constellation normalizer 433 with the power-down factor and neighbor cell pilot position information.

The constellation normalizer 433 generates constellation diagrams normalized based on the original constellation diagram for use in transmitting data with one of the tones of a symbol and a control information factor. The generated constellation diagrams are provided to the demodulator 435 for use at the pilot position of the neighbor cell.

The demodulator 435 tries demodulation using the original constellation diagram and normalized constellation diagram at the pilot position of the neighbor cell. When the transmitter transmits a normal symbol without power-down, the demodulator 435 performs demodulation normally using the original constellation diagram. When the transmitter transmits a symbol to which power-down is applied, the demodulator 435 performs demodulation normally using the normalized constellation diagram.

In certain embodiments, the demodulator 435 is capable of performing demodulation with two different constellation diagrams and outputting the symbols demodulated normally with the respective constellation diagrams. The demodulated symbols are input to the decoder 319, which decodes the symbols. When using the receiver described with reference to FIG. 4D, it is possible to mitigate interference (contamination) to the neighbor cell pilot signal which is caused by the power boosted at a specific tone.

Descriptions are made of the configuration and operation of the receiver which is appropriate when the transmitter provides the receiver with only the power-down factor at the whole symbol or a specific position of the symbol.

FIG. 4E illustrates a configuration of the receiver for processing received data based on only the power-down factor provided by the transmitter according to the first embodiment of the present disclosure.

Referring to FIG. 4E, the received signal 301 is input to a Fast Fourier Transform (FFT) processor 311. The FFT processor 311 processes the received signal 301 to output discrete frequency signals. Among the output signals, the control signal is input to a power-down factor detector 441. The data signal is input to a demodulator 445. The control signal is transmitted through a channel different in time or frequency from that of the data signal or as inserted at a specific position of the data signal. All the cases are available in the present disclosure without restriction.

The power-down factor detector 441 acquires the power-down factor for use when the transmitter uses power-down mode through a control channel or a predetermined channel. When the power-down factor is detected, the power-down factor detector 441 provides the constellation normalizer 443 with the power-down factor.

When it is determined that the power-down is applied based on the power-down factor, the constellation normalizer 443 normalizes the constellation diagram based on the power-down factor. Since the constellation normalization has been described with reference to FIG. 3B above, detailed description thereof is omitted herein. Since the constellation normalizer 443 does not know the symbol to which the power-down has been applied, it provides the demodulator 445 with the constellation diagrams normalized based on the power-down mode along with the original constellation diagram for all symbols. When the demodulator 445 has the original constellation diagram, the constellation normalizer 443 provides only the normalized constellation diagrams.

Accordingly, the demodulator 445 tries demodulation on the received data symbols using the original constellation diagram and the constellation diagrams normalized based on the power-down factors. When the demodulator 445 tries demodulating every symbol using the original and normalized constellation diagrams, the demodulation is performed successfully with the constellation diagram suited for each symbol. The symbol demodulated by the demodulator 445 is input to the decoder 319, which decodes the demodulated symbol. When using the receiver configured as shown in FIG. 4E, it is possible to mitigate interference (contamination) to the neighbor cell pilot signal which is caused by the power boosted at a specific tone.

The descriptions have been made of the configurations and operations of the receivers that are operating based on the information provided by the transmitter which transmits a symbol having a specific tone carrying data to which power-down is applied with reference to FIG. 2B. Although certain components arranged at the same position in the respective drawings are described with different reference numbers, they are implemented in the form of identical devices. For example, since the control information extractor 321 of FIG. 3B, the power-down symbol detector 401 of FIG. 4A, the pilot position detector 411 of FIG. 4B, the power-down indicator detector 421 of FIG. 4C, the control information receiver 431 of FIG. 4D, and the power-down factor detector 441 of FIG. 4E are all receiving information through the control channel, they can be referred to as "control channel receiver". The reason for using different reference numbers and names in FIGS. 3A, 3B, and 4A to 4E is to help understand the functional operations thereof.

Likewise, the constellation normalizers 323, 433, and 443 and the constellations regenerators 403 and 423 of FIGS. 3B and 4A to 4E are referred to as "constellation converters." It should be noted that the reason for using different reference numbers and names is to help understand the functional operations thereof. This holds true to the cases of the demodulator and candidate power-down factor storage.

<Second Embodiment>

The second embodiment of the present disclosure is directed to a method of mitigating interference at the pilot position of the neighbor cell when the transmitter transmits data in the FQAM mode as a hybrid modulation scheme. In the first embodiment, the receivers for processing data transmitted in the transmission scheme of applying power-down at the tone carrying data in a symbol are described. In the second embodiment, the description is directed to using multiple tones in a symbol to mitigate interference in a specific situation, e.g. at a pilot position of the neighbor cell, in the FQAM mode as a hybrid modulation scheme. In the second embodiment of the present disclosure, the description is made of the method of using a set of tones for mitigating interference to the pilot signal of a neighbor cell in a wireless communication system using the FQAM scheme.

Figure 5A:
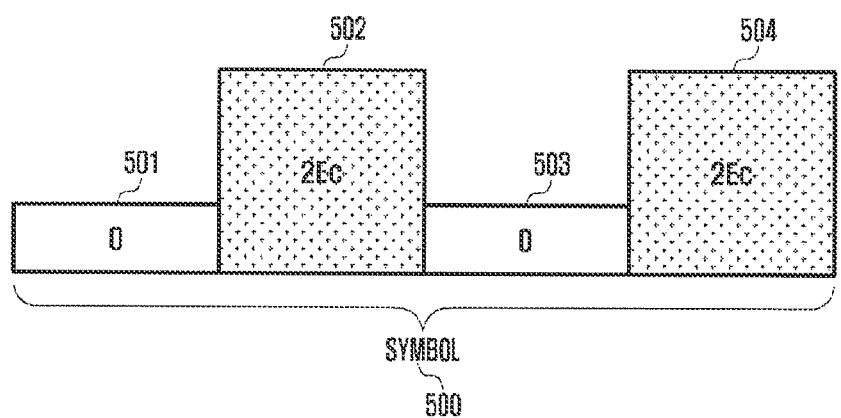
FIG. 5A illustrates a symbol configured for power-down with a set of tones in a wireless communication system using the FQAM scheme according to various embodiments of the present disclosure.

FIG. 5A illustrates a symbol configured for power-down with a set of tones in a wireless communication system using the FQAM scheme according to the second embodiment of the present disclosure.

Let's compare FIG. 5A with FIGS. 2A and 2B. In FIGS. 2A and 2B, one active tone is used to carry data. Meanwhile, in FIG. 5A, multiple tones (two or more tones) are used to carry data. In certain embodiments, the modulation scheme is configured such that the modulation order at each tone carrying data becomes identical with the modulation order in using a single tone to achieve the same effect as the case of FIGS. 2A and 2B. For example, when a single tone is used with the 16-FQAM scheme, the 16-FQAM scheme is applied to each tone of the multi-tone mode.

FIG. 5A is directed to the case where one symbol 500 consists of four tones 501, 502, 503, and 504. Among the four tones, two tones 502 and 504 carry data. When two of the four tones of one symbol are used to carry data, as an alternative embodiment to FIG. 5A, the number of cases of available combinations of the tones is six.

The first and second tones 501 and 502 carry data.
The first and third tones 501 and 503 carry data.
The first and fourth tones 501 and 504 carry data.
The second and third tones 502 and 503 carry data.
The second and fourth tones 502 and 504 carry data.
The third and fourth tones 503 and 504 carry data.

The modulation order at the each tone carrying data in the above six cases has to be identical with the modulation order when FIGS. 2A and 2B. The transmitter uses all or at least one of the six cases for data transmission in the wireless communication system.

When the same modulation order is applied to the tones carrying data, the transmit power at each of the tones 502 and 504 becomes one half of the transmit power required at the tone carrying data in the single tone mode. FIG. 2A exemplifies the case where the transmit power of 4Ec is applied to one tone. Accordingly, in order to meet the above requirement in that the total transmit power applied to the two tones when FIG. 5A is equal to the transmit power applied to one tone when FIG. 2A, the sum of the transmit powers at the two tones carrying data should be 4Ec. This means that the transmit power of 2Ec is applied at each of the tones 502 and 504 carrying data.

Descriptions are made of the method of combining tones for carrying data with reference to FIG. 5B hereinafter. The reason for restricting the tone combinations to four kinds is to make it possible to transmit preconfigured tone arrangement index information and provide the tone combination information with the minimum information amount.

FIG. 5B illustrates indices indicating tones carrying data in the transmission mode of transmitting data using two tones according to the second embodiment of the present disclosure.

FIG. 5B is directed to the case of using a set index of two bits and supporting four of the six data-carrying tone combinations described above.

First, the set index 00 indicates the combination of the second and third tones 512 and 513, which are marked with vertical arrows to express carrying data among the four tones 511, 512, 513, and 514 constituting one symbol. The rest tones 511 and 514 are marked with dots to express carrying no data. As described above, the transmit power of each of the active tones 512 and 513 carrying data is 2Ec.

Second, the set index 01 indicates the combination of the first and third tones 521 and 523, which are marked with vertical arrows to express carrying data among the four tones 521, 522, 523, and 524 constituting one symbol. The rest tones 522 and 524 are marked with dots to express carrying no data. As described above, the transmit power of each of the active tones 521 and 523 carrying data is 2Ec.

Third, the set index 10 indicates the combination of the second and fourth tones 532 and 534, which are marked with vertical arrows to express carrying data among the four tones 531, 532, 533, and 534 constituting one symbol. The rest tones 531 and 533 are marked with dots to express carrying no data. As described above, the transmit power of each of the active tones 532 and 534 carrying data is 2Ec.

Fourth, the set index 11 indicates the combination of the first and second tones 541 and 542, which are marked with vertical arrows to express carrying data among the four tones 541, 542, 543, and 544 constituting one symbol. The rest tones 543 and 544 are marked with dots to express carrying no data. As described above, the transmit power of each of the active tones 541 and 542 carrying data is 2Ec.

Although FIG. 5B is directed to the case where the set index is two bits, it is also possible to use the set index of three or more bits to indicate six distinct combinations. Also, the number of bits constituting the set index changes depending on the number of tones constituting one symbol. For example, when one symbol consists of five tones in which two or more tones carry data, the number of cases of set indices changes depending on the number of tones constituting one symbol and the number of combinations of tones carrying data. When the number of cases of set indices changes, the number of set indices changes correspondingly.

When multiple tones carry data as shown in FIGS. 5A and 5B and when the modulation order at the tones carrying data is identical with the modulation order used when one tone carries data, the receiver is configured differently depending on the information provided by the transmitter. The transmitter provides the receiver with the information as follows.

First, the transmitter provides the receiver with the set index indicating combination of the tones carrying data and positions of the symbols in which the corresponding set is used.

Second, the transmitter provides the receiver with only the information on the position of the symbol in which the multi-tone set is used.

Third, the transmitter provides the receiver with the set index indicating combination of the tones carrying data and information on the pilot positions of neighbor cells which are considered in use of the multi-tone set.

Fourth, the transmitter provides the receiver with only the information on the pilot positions of neighbor cells which are considered in use of the multi-tone set.

Fifth, the transmitter provides the receiver with only the information on whether the multi-ton set is used.

Figure 6A:
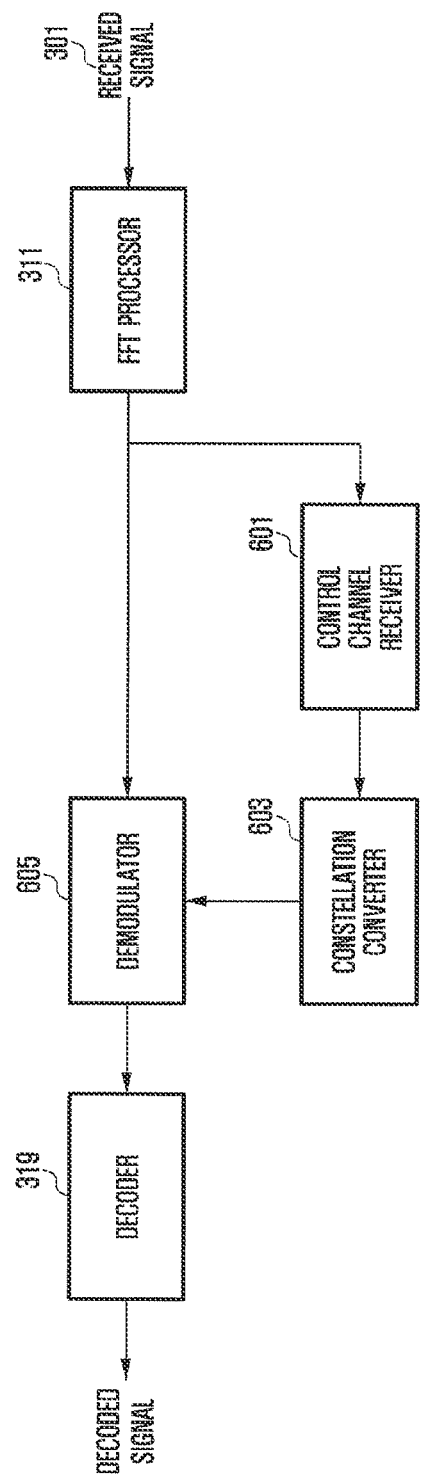
FIG. 6A illustrates a configuration of the receiver for processing received data based on the multi-tone set index and information on the positions of the symbols in which the corresponding set is used that are provided by the transmitter according to various embodiments of the present disclosure.

FIG. 6A illustrates a configuration of the receiver for processing received data based on the multi-tone set index and information on the positions of the symbols in which the corresponding set is used that are provided by the transmitter according to the second embodiment of the present disclosure.

Referring to FIG. 6A, the received signal 301 is input to a Fast Fourier Transform (FFT) processor 311. The FFT processor 311 processes the received signal 301 to output discrete frequency signals. Among the output signals, the control signal is input to a control channel receiver 601. The data signal is input to a demodulator 605. The control signal is transmitted through a channel different in time or frequency from that of the data signal or as inserted at a specific position of the data signal. All the cases are available in the present disclosure without restriction.

The control channel receiver 601 analyzes the control signal from the FFT processor 311 and, when the data are carried in two or more tones in one symbol, extracts the multi-tone set index indicating arrangement of the tones and positions to which the corresponding set is applied. The description is made with reference to the exemplary case of FIG. 5B in which one symbol consists of four tones of which two tones carry data. The control channel receiver 601 detects the positions of the tones carrying data in the corresponding symbol based on the multi-tone set index received through the control channel. For example, the multi-tone set index of 00 indicates that the second and third tones carry data in the multi-tone symbol, the multi-tone set index of 01 indicates that the first and third tones carry data in the multi-tone symbol, the multi-tone set index of 10 indicates that the second and fourth tones carry data in the multi-tone symbol, and the multi-tone set index of 11 indicates that the first and second tones carry data in the multi-tone symbol. The control channel receiver 601 provides the constellation converter 603 with the detected set index and the position information of the corresponding set.

The constellation converter 603 generates a constellation diagram to be applied to the symbols having two or more tones carrying data using the multi-tone set index. In an exemplary case that two or more tones carry data, the constellation converter 603 generates a constellation diagram to be applied according to the transmit power value applied to the corresponding tone. When one tone carries data in one symbol and if 16-FQAM scheme is applied to the corresponding tone, the sum of the modulation orders applied to the respective tones should be identical with that of 16-FQAM. Since the modulation orders applied at the respective tones are identical with each other, the constellation converter 603 generates the constellation diagram corresponding to the power value applied to each tone. The constellation converter 603 is capable of generating the constellation diagrams corresponding to the transmit power values applied to the respective tones and providing the demodulator 605 with the constellation diagrams in the order of the symbols based on the information on the positions of the corresponding set received from the control channel receiver 601.

The demodulator 605 applies the constellation diagrams from the constellation converter 603 at the corresponding timings to demodulate the data signals from the FFT processor 311. When a reconfigured constellation diagram is not provided by the constellation converter 603 or only the original constellation diagram is provided, the demodulator 605 performs demodulation with the original constellation diagram. When the constellation diagram reconfigured in correspondence to the modulation order is received from the constellation converter 605, the demodulator 605 performs demodulation on the received data symbol using the converted constellation diagram.

When using the receiver configured as shown in FIG. 6A, the transmitter generates a specific symbol having two or more tones carrying data which are allocated power split into the number thereof and then transmit the symbol. The transmitter provides the receiver with the set index information and information on the positions to which the corresponding set is used so as to be able to transmit the symbol with the power-down effect. When using the receiver configured as shown in FIG. 6A, it is possible to mitigate interference (contamination) to the neighbor cell pilot signal which is caused by the power boosted at specific tones in the wireless communication.

Figure 6B:
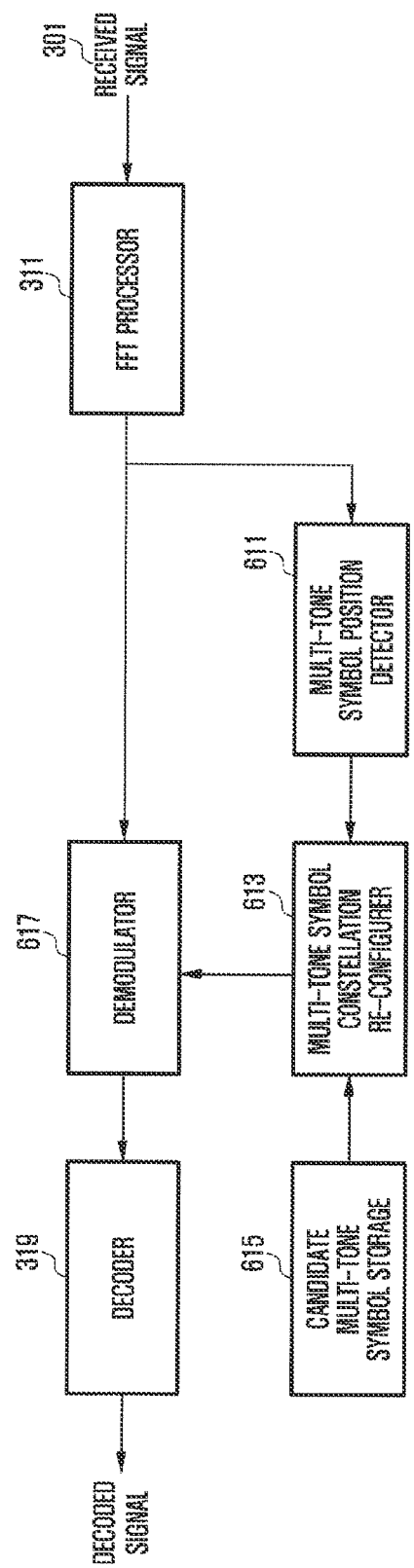
FIG. 6B illustrates a configuration of the receiver for processing received data based on the multi-tone symbol information transmitted by the transmitter according to various embodiments of the present disclosure.

FIG. 6B illustrates a configuration of the receiver for processing received data based on the multi-tone symbol information transmitted by the transmitter according to the second embodiment of the present disclosure.

Referring to FIG. 6B, the received signal 301 is input to a Fast Fourier Transform (FFT) processor 311. The FFT processor 311 processes the received signal 301 to output discrete frequency signals. Among the output signals, the control signal is input to a multi-tone symbol position detector 611. The data signal is input to a demodulator 617. The control signal is transmitted through a channel different in time or frequency from that of the data signal or as inserted at a specific position of the data signal. All the cases are available in the present disclosure without restriction.

The multi-tone symbol position detector 611 analyzes the control signal from the FFT processor 311 to detect the position of the multi-tone symbol transmitted by the transmitter. The multi-tone symbol is the symbol including two or more tones carrying data as shown in FIGS. 5A and 5B. The receiver of FIG. 6B is configured for the case where the transmitter provides only the information on the position of the symbol including two or more tones carrying data which is supposed to be carried in one tone per symbol. Accordingly, the multi-tone symbol position detector 611 detects the information on the position of the symbol including multiple tones carrying data and provides the information to the multi-tone symbol constellation re-configurer 613.

The candidate multi-tone symbol storage 615 is a memory for storing the values capable of being used for multi-tone symbols that are predetermined in negotiation with the transmitter. The values capable of being used for multiple-tone symbol is the power values capable of being used at specific symbol as described with reference to FIG. 5A, e.g. the information on the power value dropped as compared to the original power value and the modulation order information for each tone in use of the multiple tones. The candidate multi-tone symbol storage 615 also stores the information on the arrangement of the multiple tones if necessary. When storing the multi-tone arrangement information, the candidate multi-tone symbol storage 615 provides the multi-tone symbol constellation re-configurer 613 with the multi-tone arrangement information together.

The information retained in the candidate multi-tone symbol storage 615 is the information provided by the transmitter or the information stored in the manufacturing state of the receiver. When there are plural transmitters using different types of multi-tone symbols, the receiver receives and stores the transmitter-specific multi-tone use information in advance. Assuming that all transmitters use a scheme selected respectively among a plurality of schemes predetermined according to the rule of the wireless communication system, the values are the values stored as configured in the manufacturing state of the receiver. How to store the information in the candidate multi-tone symbol storage 615 is not limited in the present disclosure.

The multi-tone symbol constellation re-configurer 613 reconfigures the constellation diagrams to be provided to the demodulator 617 using the candidate multi-tone symbol information provided by the candidate multi-tone symbol storage 615. For example, the transmitter transmits data at the transmit power which is half of the transmit power of the original symbol with a modulation order lower than that applied to the original symbol. The multi-tone symbol constellation re-configurer 613 generates the constellation diagrams corresponding to various powers and modulation orders that can be used. The multi-tone symbol constellation re-configurer 613 also provides the demodulator 617 with the constellation diagrams reconfigured based on the multi-tone symbol position information provided by the multi-tone symbol position detector 611.

The modulator 617 receives only the original constellation diagram for the symbol including one tone carrying data and reconfigured constellation diagram(s) at specific timing. The modulator 617 includes the original constellation diagram for use when the data is carried by one tone and receive the reconfigured constellation diagram to be applied at specific timing.

In certain embodiments, when the demodulator 617 receives the reconfigured constellation diagram(s) for use at specific timing in the state of using the original constellation diagram, it tries demodulation using the received constellation diagram(s). When two or more constellation diagrams are provided by the multi-tone symbol constellation re-configurer 613, the demodulator 617 selects the constellation diagram suitable for demodulating the symbol.

In the second case, when the demodulator 617 receives the reconfigured constellation diagram(s) for use at specific timing in the state of demodulating the input symbols using the constellation diagram it has, it tries demodulating the symbols from the FFT processor 311 using the constellation diagrams provided by the multi-tone symbol constellation re-configurer 613. Even in certain embodiments, when two or more constellation diagrams are provided by the multi-tone symbol constellation re-configurer 613, the demodulator 617 selects the constellation diagram suitable for demodulating the symbol.

The demodulated symbol is input to the decoder 319. The decoder 319 decodes the demodulated symbol.

When using the receiver configured as shown in FIG. 6B, the transmitter generates a specific symbol having two or more tones carrying data which are allocated power split into the number thereof and then transmit the symbol. When using the receiver configured as shown in FIG. 6B, it is possible to mitigate interference (contamination) to the neighbor cell pilot signal which is caused by the power boosted at specific tones in the wireless communication system.

Figure 6C:
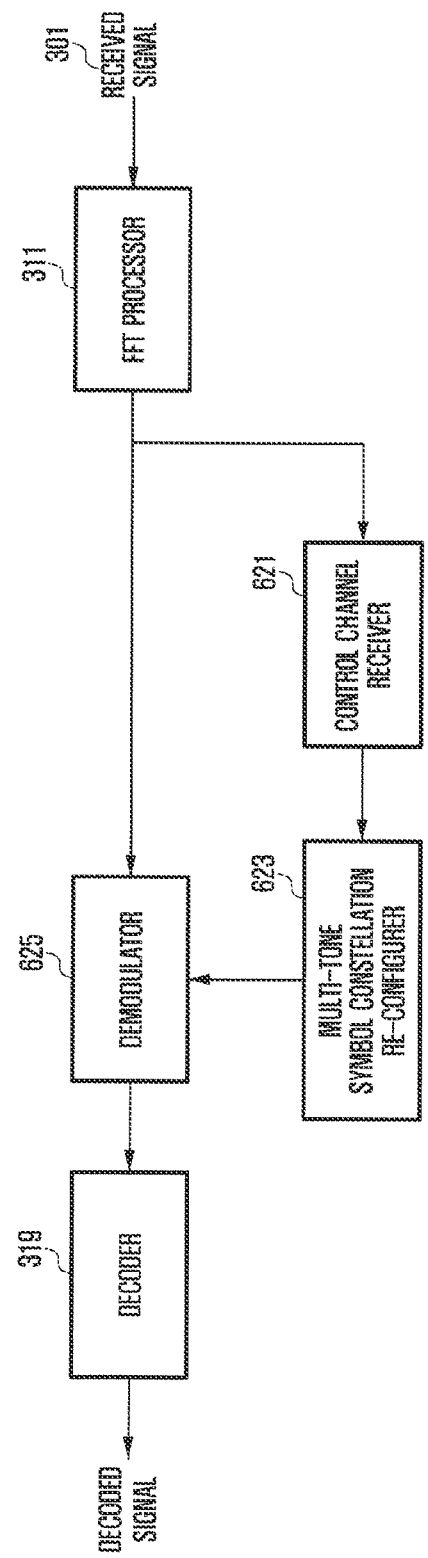
FIG. 6C illustrates a configuration of the receiver for processing received data based on the set index and the information on the pilot position of the neighbor cell which is considered in use of multi-tone set that are transmitted by the transmitter according to various embodiments of the present disclosure.

FIG. 6C illustrates a configuration of the receiver for processing received data based on the set index and the information on the pilot position of the neighbor cell which is considered in use of multi-tone set that are transmitted by the transmitter according to the second embodiment of the present disclosure.

Referring to FIG. 6C, the received signal 301 is input to a Fast Fourier Transform (FFT) processor 311. The FFT processor 311 processes the received signal 301 to output discrete frequency signals. Among the output signals, the control signal is input to a control channel receiver 621. The data signal is input to a demodulator 625. The control signal is transmitted through a channel different in time or frequency from that of the data signal or as inserted at a specific position of the data signal. All the cases are available in the present disclosure without restriction.

The control channel receiver 621 analyzes the control signal from the FFT processor 311 to check the multi-tone set index used in transmitting the symbol carrying data and the neighbor cell pilot position considered in applying the multi-tone set. The multi-ton set index informs of the arrangement of the tones carrying data in a symbol and powers allocated to the respective tones as described above with reference to FIGS. 5A and 5B. The neighbor cell pilot position considered in use of the multi-tone set is the position of the symbol having the multiple tones carrying data. In a specific case, however, only one tone is used to carry data. This is the case in that the tone carrying the neighbor cell pilot differs in position from the tone carrying data in a symbol.

The multi-tone symbol constellation re-configurer 623 checks the arrangement of the tones carrying data and power levels at the corresponding tones from the multi-tone index information provided by the control channel receiver 621. The multi-tone symbol constellation re-configurer 623 reconfigures the constellation diagram of the multi-tone symbol using the power information. The multi-tone symbol constellation re-configurer 623 also regards the position of the symbol carrying the neighbor cell pilot signal which is provided by the control channel receiver 621 as the position of the symbol to which the reconfigured constellation diagram is applied.

Since a multi-tone symbol is not used, even at the position of the neighbor cell pilot signal as described above, the multi-tone symbol constellation re-configurer 623 provides the demodulator 625 with the reconfigured constellation diagram information along with the original constellation diagram information.

The multi-tone symbol constellation re-configurer 613 provides the demodulator 525 with only the original constellation diagram for use of the symbol having one tone carrying data and then the constellation diagrams reconfigured for use at specific timings. The demodulator 625 includes the original constellation diagram for use of the symbol having one tone carrying data and receives only the constellation diagrams reconfigured for use at specific timings. The demodulator 625 is capable of performing demodulation using the constellation diagram it has or the reconfigured constellation diagrams provided by the multi-tone constellation re-configurer 623. The demodulated symbol is input to the decoder 319. The decoder 319 decodes the demodulated symbol.

When using the receiver configured as shown in FIG. 6C, the transmitter generates a specific symbol having two or more tones carrying data that are allocated power split into the number thereof and then transmit the symbol. The transmitter provides the receiver with the multi-tone set index and the information on the pilot positions of the neighbor cell(s) that are considered for used of the multi-tone symbol. When using the receiver configured as shown in FIG. 6C, it is possible to mitigate interference (contamination) to the neighbor cell pilot signal which is caused by the power boosted at specific tones in the wireless communication system.

Figure 6D:
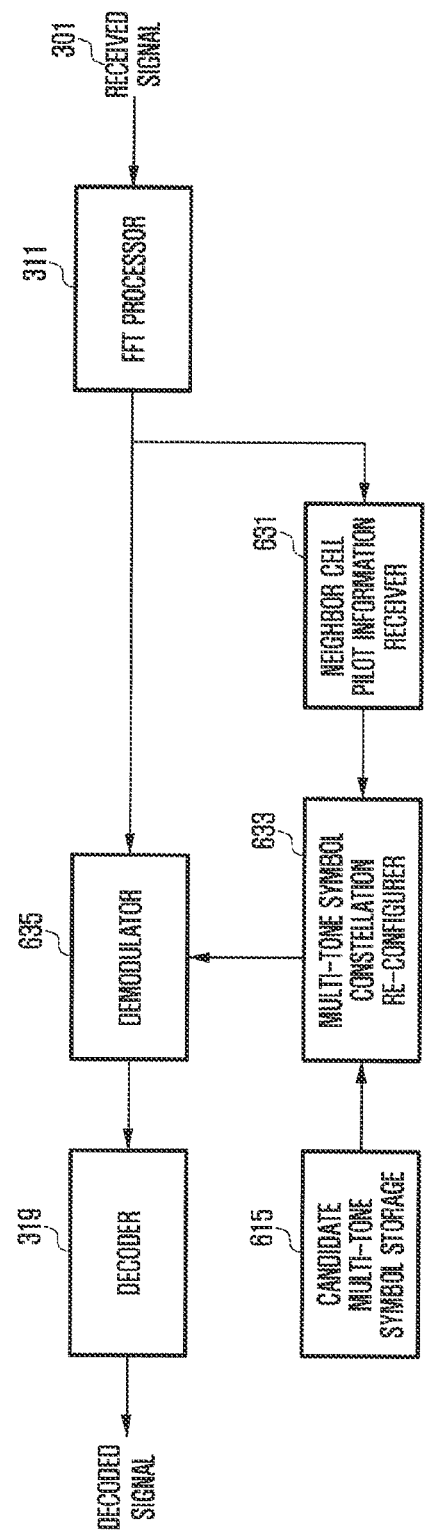
FIG. 6D illustrates a configuration of the receiver for processing received data based on the information on neighbor cell pilot positions considered for use of the multi-tone set that is provided by the transmitter according to various embodiments of the present disclosure.

FIG. 6D illustrates a configuration of the receiver for processing received data based on the information on neighbor cell pilot positions considered for use of the multi-tone set, which is provided by the transmitter according to the second embodiment of the present disclosure.

Referring to FIG. 6D, the received signal 301 is input to a Fast Fourier Transform (FFT) processor 311. The FFT processor 311 processes the received signal 301 to output discrete frequency signals. Among the output signals, the control signal is input to a neighbor cell pilot information receiver 631. The data signal is input to a demodulator 635. The control signal is transmitted through a channel different in time or frequency from that of the data signal or as inserted at a specific position of the data signal. All the cases are available in the present disclosure without restriction.

The neighbor cell pilot information receiver 631 analyzes the control signal from the FFT processor 311 to check the neighbor cell pilot positions considered for use of the multi-tone set in a symbol. The neighbor cell pilot positions considered for use of the multi-tone set are identical with the position information of the symbol in which the multi-tone set is used. When the pilot tone differs in position from the data tone in the corresponding symbol, however, the multi-tone set may not be used. There are one or more neighbor cells. When the transmitter is a base station of a cellular system, it is typical that there are three or more neighbor base stations around the transmitter. Accordingly, the neighbor cell pilot information receiver 631 checks the one or more neighbor cell pilot positions and provide the multi-tone symbol constellation re-configurer 633 with the information on the neighbor cell pilot positions. In a specific case, however, only one tone is used to carry data as described above. This is the case in that the tone carrying the neighbor cell pilot differs in position from the tone carrying data in a symbol.

The candidate multi-tone symbol storage 615 is a memory for storing the values capable of being used for multi-tone symbols that are predetermined in negotiation with the transmitter. The values capable of being used for multiple-tone symbol is the power values capable of being used at specific symbol as described with reference to FIG. 5A, e.g. the information on the power value dropped as compared to the original power value and the modulation order information for each tone in use of the multiple tones. The candidate multi-tone symbol storage 615 also stores the information on the arrangement of the multiple tones if necessary. When storing the multi-tone arrangement information, the candidate multi-tone symbol storage 615 provides the multi-tone symbol constellation re-configurer 613 with the multi-tone arrangement information together.

The information retained in the candidate multi-tone symbol storage 615 is the information provided by the transmitter or the information stored in the manufacturing state of the receiver. When there are many transmitters using different types of multi-tone symbols, the receiver receives and stores the transmitter-specific multi-tone use information in advance. Assuming that all transmitters use a scheme selected respectively among a plurality of schemes predetermined according to the rule of the wireless communication system, the values are the values stored as configured in the manufacturing state of the receiver. How to store the information in the candidate multi-tone symbol storage 615 is not limited in the present disclosure.

The multi-tone symbol constellation re-configurer 633 receives the neighbor cell pilot position information from the neighbor cell pilot information receiver 631 and the candidate multi-tone symbols from the candidate multi-tone symbol storage 615. The multi-tone symbol constellation re-configurer 633 reconfigures the multi-tone symbol constellation diagrams to be used in the demodulator 635 and output the multi-tone symbol constellation diagrams to the demodulator 635. After receiving the neighbor cell pilot position information from the neighbor cell pilot information receiver 631, the multi-tone symbol constellation re-configurer 633 provides the demodulator 635 with the information on the timing for applying the constellation diagram in synchronization with the demodulation timings of the corresponding symbol. Since the multi-tone set may not be applied in the corresponding symbol, the original constellation diagram is provided along with. When the demodulator 635 has the original constellation diagram already, the multi-tone symbol constellation re-configurer 633 may not provide the original constellation diagram.

The demodulator 635 tries demodulation using the original constellation diagram it has or the reconfigured constellation diagrams provided by the multi-tone symbol constellation re-configurer 633. The demodulated symbol is input to the decoder 319. The decoder 319 decodes the demodulated symbol.

When using the receiver configured as shown in FIG. 6D, the transmitter generates a specific symbol including two or more tones carrying data that are allocated power split into the number thereof and then transmit the symbol. When using the receiver configured as shown in FIG. 6C, it is possible to mitigate interference (contamination) to the neighbor cell pilot signal which is caused by the power boosted at specific tones in the wireless communication system.

Figure 6E:
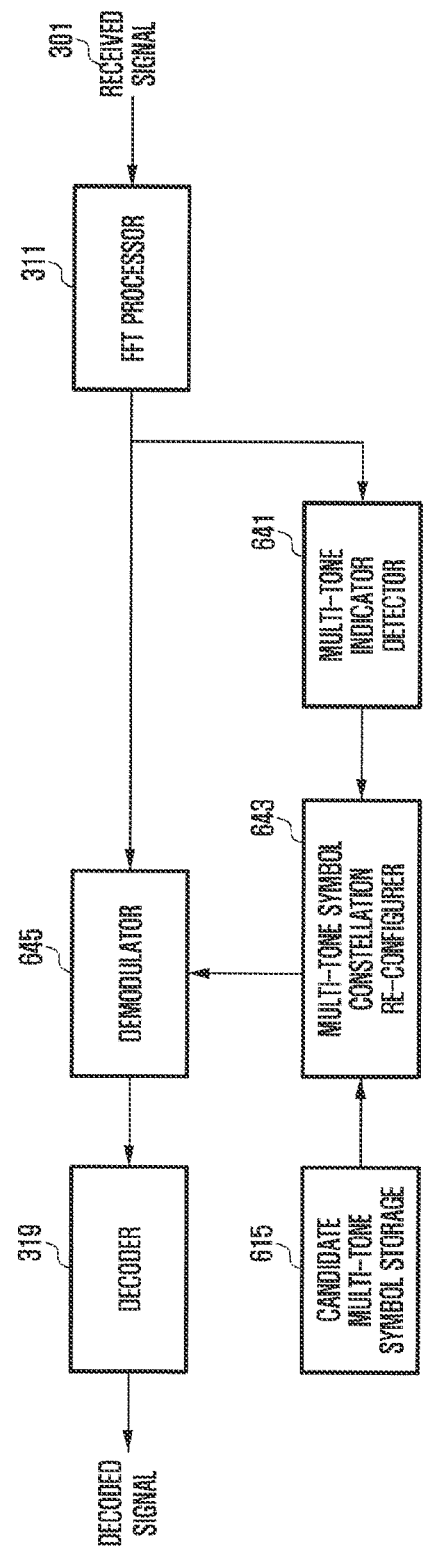
FIG. 6E illustrates a configuration of the receiver for processing received data based on the information on whether the transmitter uses multi-tone set according to various embodiments of the present disclosure.

FIG. 6E illustrates a configuration of the receiver for processing received data based on the information on whether the transmitter uses multi-tone set according to the second embodiment of the present disclosure.

Referring to FIG. 6E, the received signal 301 is input to a Fast Fourier Transform (FFT) processor 311. The FFT processor 311 processes the received signal 301 to output discrete frequency signals. Among the output signals, the control signal is input to a multi-tone indicator detector 641. The data signal is input to a demodulator 625. The control signal is transmitted through a channel different in time or frequency from that of the data signal or as inserted at a specific position of the data signal. All the cases are available in the present disclosure without restriction.

The multi-tone indicator detector 641 analyzes the control signal from the FFT processor 311 to detect the multi-tone indicator indicating whether the multi-tone set is used. The multi-tone indicator is a 1-bit indicator to indicate whether there is a symbol to which a multi-tone set is applied among the symbols transmitted by the transmitter. The multi-tone indicator indicates whether there is any multi-tone symbol among the symbols transmitted by the transmitter in series or whether transmitter transmits data symbols having multiple symbols carrying data to all the receivers.

The multi-tone indicator detector 641 checks whether the multiple tones are used based on the received multi-tone indicator and outputs the check result to the multi-tone symbol constellation re-configurer 633. When the multi-tone indicator indicates that multiple tones are not used, the multi-tone symbol constellation re-configurer 633 does not perform reconfiguration of constellation diagrams. When the multi-tone indicator indicates that multiple tones are used, the multi-tone symbol constellation re-configurer 633 reconfigures the constellation diagram in correspondence to the use of multiple tones. When the demodulator 645 includes the original constellation diagram such that the multi-tone symbol constellation re-configurer 643 does not provide the demodulator 645 with the original constellation diagram, the output of the multi-tone indicator detector 641 is the signal for controlling on/off operation of the multi-tone symbol constellation re-configurer 643.

The candidate multi-tone symbol storage 615 is a memory for storing the values capable of being used for multi-tone symbols that are predetermined in negotiation with the transmitter. The values capable of being used for multiple-tone symbol are the power values capable of being used at specific symbol as described with reference to FIG. 5A. e.g. the information on the power value dropped as compared to the original power value and the modulation order information for each tone in use of the multiple tones. The candidate multi-tone symbol storage 615 also stores the information on the arrangement of the multiple tones if necessary. When storing the multi-tone arrangement information, the candidate multi-tone symbol storage 615 provides the multi-tone symbol constellation re-configurer 643 with the multi-tone arrangement information together.

The information retained in the candidate multi-tone symbol storage 615 is the information provided by the transmitter or the information stored in the manufacturing state of the receiver. When there are many transmitters using different types of multi-tone symbols, the receiver receives and stores the transmitter-specific multi-tone use information in advance. Assuming that all transmitters use a scheme selected respectively among a plurality of schemes predetermined according to the rule of the wireless communication system, the values are the values stored as configured in the manufacturing state of the receiver. How to store the information in the candidate multi-tone symbol storage 615 is not limited in the present disclosure.

When the multi-tone indicator indicates that multiple tones are used, the multi-tone symbol constellation re-configurer 643 generates various constellation diagrams necessary for demodulating symbols using the information stored in the candidate multi-tone symbol storage 615 and provide the demodulator 645 with the generated constellation diagrams. When the demodulator 645 has no original constellation diagram, the multi-tone symbol constellation re-configurer 643 provides the demodulator 645 with the original constellation diagram too.

Since no information on the symbol having multiple tones carrying data and the arrangement of the multiple tone in the symbol is provided, the demodulator 635 tries demodulation on all the symbols using the original constellation diagram and the reconfigured constellation diagrams provided by the multi-tone symbol constellation re-configurer 643. The demodulated symbol is input to the decoder 319. The decoder 319 decodes the demodulated symbol.

When using the receiver configured as shown in FIG. 6E, the transmitter generates a specific symbol having two or more tones carrying data that are allocated power split into the number thereof and then transmit the symbol. The transmitter provides the receiver with the multi-tone indicator indicating only whether multiple tones are used. When using the receiver configured as shown in FIG. 6E, it is possible to mitigate interference (contamination) to the neighbor cell pilot signal which is caused by the power boosted at specific tones in the wireless communication.

The descriptions have been made of the configurations and operations of the receivers that are operating based on the information provided by the transmitter which transmits a multi-tone symbol having specific tones carrying data as exemplified in FIGS. 5A and 5B. Although certain components arranged at the same position in the respective drawings are described with different reference numbers, they are implemented in the form of identical devices. For example, since the control channel receiver 601 of FIG. 6A, the multi-tone symbol position detector 611 of FIG. 6B, the control channel receiver 621 of FIG. 6C, the neighbor cell pilot information receiver 631 of FIG. 6D, and the multi-tone indicator detector 641 of FIG. 6E are all receiving information through the control channel, they can be referred to as "control channel receiver". It should be noted that the reason for using different reference numbers and names in FIGS. 6A to 6E is to help understand the functional operations thereof.

Likewise, the constellation re-configurers 613, 623, 633, and 643, and the constellation converter 603 is referred to as "constellation converter." It should be noted that the reason for using different reference numbers and names is to help understand the functional operations thereof. This holds true to the cases of the demodulator and candidate power-down factor storage.

<The Third Embodiment>

The third embodiment of the present disclosure is directed to a method of mitigating interference to neighbor cell pilot signals when using a multi-symbol set in a wireless communication system using the FQAM as a hybrid modulation scheme.

When a multi-symbol set is used, this means that the number of active tones carrying data and modulation order are different in every symbol in one code frame. When using a multi-symbol set, the symbol is configured as exemplified in FIG. 2A or FIGS. 5A and 5B. When using the multi-tone set described above, the modulation order of the symbol of FIG. 2A is identical with the modulation order of the symbol of FIGS. 5A and 5B. When using the multi-symbol set to transmit data with the symbol configured as shown in FIGS. 5A and 5B which has the same modulation order as the symbol of FIG. 2A, the sum of the data carried by the all tones is identical with the sum of the data corresponding to the modulation scheme exemplified in FIG. 2A. When the 64-FQAM scheme is used for the tone carrying the data in FIG. 2A, the data is split in two for the two active tones as shown in FIGS. 5A and 5B so as to be transmitted in 32-FQAM mode. When using the 32-FQAM scheme, the data is transmitted as split in two.

When transmitting data with a multi-symbol set, the receiver is configured differently depending on the information provided by the transmitter. The transmitter provides the receiver with the information as follows.

First, the transmitter provides the receiver with the multi-symbol set index and information on the positions of the multiple symbols.

Second, the transmitter provides the receiver with only the information on the positions of the symbols, which use the multi-symbol set.

Third, the transmitter provides the receiver with the information of pilot positions of the neighbor cells when considering use of the multi-symbol set.

Fourth, the transmitter provides the receiver with the information on whether a multi-symbol set is used.

Figure 7A:
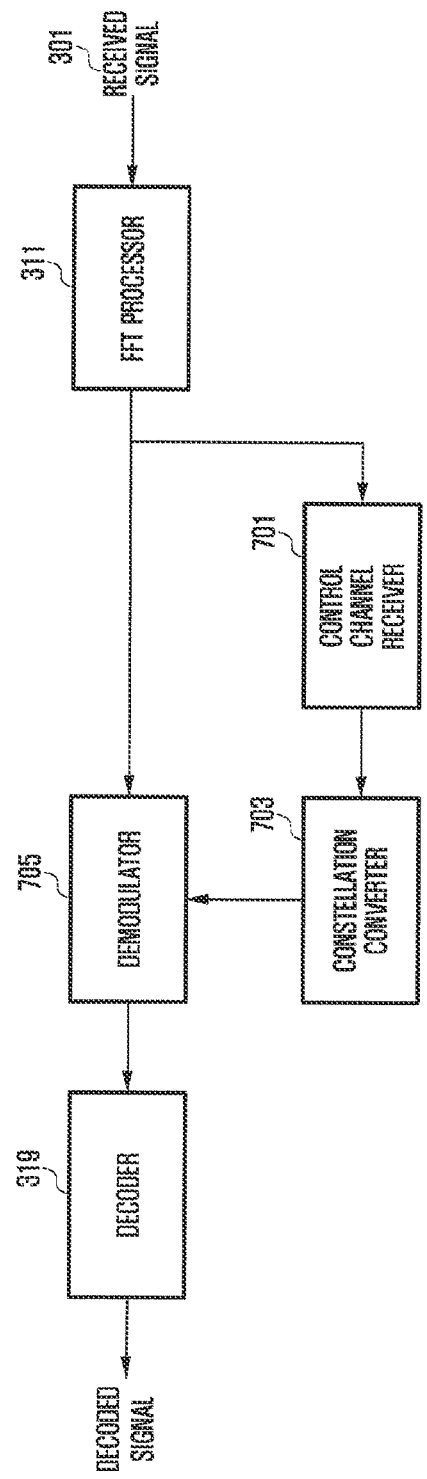
FIG. 7A illustrates a configuration of the receiver for processing received data based on the multi-symbol set index and multiple symbol positions information provided by the transmitter according to various embodiments of the present disclosure.

FIG. 7A is a block diagram illustrating a configuration of the receiver for processing received data based on the multi-symbol set index and multiple symbol positions information provided by the transmitter.

Referring to FIG. 7A, the received signal 301 is input to a Fast Fourier Transform (FFT) processor 311. The FFT processor 311 processes the received signal 301 to output discrete frequency signals. Among the output signals, the control signal is input to a control channel receiver 701. The data signal is input to a demodulator 705. The control signal is transmitted through a channel different in time or frequency from that of the data signal or as inserted at a specific position of the data signal. All the cases are available in the present disclosure without restriction.

The control channel receiver 701 analyzes the control signal from the FFT processor 311 to check the multi-symbol set index indicating symbols carrying data positions of the symbols carrying data. When using different modulation orders at the respective tones of the symbol in FIG. 5B, it is possible to extract the modulation order and tone arrangement information per tone. The control channel receiver 701 also extracts the multi-symbol position information. The control channel receiver 701 provides the constellation converter 703 with the multi-symbol position information and multi-symbol set information.

A description is made of the exemplary case where the control channel receiver 701 acquires the multi-symbol tone arrangement information and per-tone modulation order information based on the symbol index with reference to FIG. 5B. The tone arrangement information is expressed as shown in FIG. 5B. The per-tone modulation orders are identical with or different from each other. In the following, the description is made of only the case where the per-tone modulation orders are identical with each other for explanation convenience.

When configuring the symbol having active tones carrying data at same modulation order which is lower than the modulation order applied to the active tone of the symbol which is configured with only one active tone carrying data, it is possible to acquire the per-tone modulation order from the original modulation order. When the per-tone modulations are different from each other, however, it is difficult to acquire the per-tone modulation orders from the original modulation order easily. In certain embodiments, the multi-symbol set index has to include extra information for use in acquiring the per-tone modulation orders.

A description is made of the case of using the same modulation order for the respective tones constituting a symbol hereinafter. The control channel receiver 701 checks the active tones carrying data in the corresponding symbol using the multi-symbol set index received through the control channel. For example, the multi-symbol set index of 00 indicates that the second and third tones carry data in the symbol, the multi-symbol set index of 01 indicates that the first and third tones carry data in the symbol, the multi-symbol set index of 10 indicates that the second and fourth tones carry data in the symbol, and the multi-symbol set index of 11 indicates that the first and second tones carry data in the symbol. The control channel receiver 701 provides the constellation converter 703 with the tone arrangement information using the detected multi-symbol set index.

The constellation converter 703 generates the constellation diagram to be applied to the symbol including the active tones having the modulation orders different from the original modulation order using the multi-symbol set index. When the data are carried by two or more tones, the constellation converter 703 generates the constellation diagram depending on the modulation order applied to the corresponding tone. When a symbol has one active tone carrying data with the 16-FQAM scheme, the sum of the per-tone modulation orders when using two active tones carrying the same data has to be equal to the modulation order of the 16-FQAM. Thus the constellation converter 703 has to generate the modulation diagram corresponding to the modulation order applied to the tone. In this way, the constellation converter 703 generates the constellation diagrams corresponding to the changed modulation orders and provides the demodulator 705 with the constellation diagrams in the order of the active tones based on the tone position information received from the control channel receiver 701

Then the demodulator 705 performs demodulation on the symbol input from the FFT processor 311 by applying the constellation diagrams provided by the constellation converter 705 at the corresponding timings. When the constellation converter 703 provides only the original constellation diagram but no reconfigured constellation diagram, the demodulator 705 performs demodulation with the original constellation diagram. When the constellation converter 703 provides the constellation diagrams corresponding to the modulation orders, the modulator 705 performs modulation on the received data symbols using the converted constellation diagrams. Thus the decoder 319 can decode the demodulated signal successfully.

When using the receiver configured as shown in FIG. 7A, the transmitter generates a specific symbol having two or more tones carrying data which are allocated power split into the number thereof and then transmit the symbol. The transmitter provides the receiver with the multi-symbol set index information and information on the positions to which the corresponding set is used so as to be able to transmit the symbol with the power-down effect. When using the receiver configured as shown in FIG. 7A, it is possible to mitigate interference (contamination) to the neighbor cell pilot signal which is caused by the power boosted at specific tones in the wireless communication.

Figure 7B:
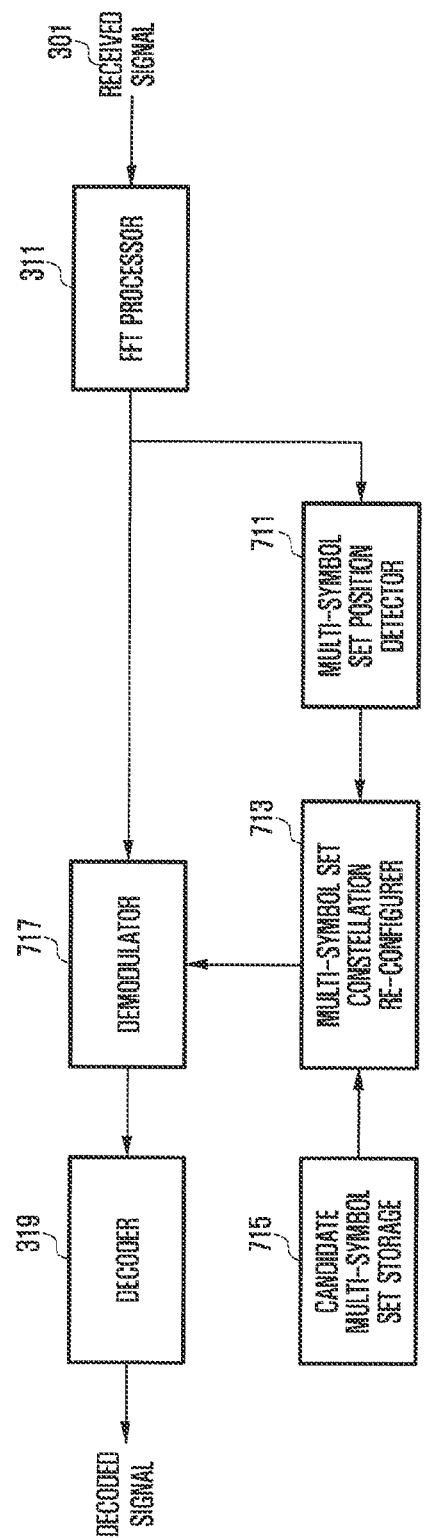
FIG. 7B illustrates a configuration of the receiver for processing received data based on the information on the positions of multi-symbol set which is provided by the transmitter according to various embodiments of the present disclosure.

FIG. 7B is a block diagram illustrating a configuration of the receiver for processing received data based on the information on the positions of multi-symbol set which is provided by the transmitter according to the third embodiment of the present disclosure.

Referring to FIG. 7B, the received signal 301 is input to a Fast Fourier Transform (FFT) processor 311. The FFT processor 311 processes the received signal 301 to output discrete frequency signals. Among the output signals, the control signal is input to a multi-symbol symbol set position detector 711. The data signal is input to a demodulator 717. The control signal is transmitted through a channel different in time or frequency from that of the data signal or as inserted at a specific position of the data signal. All the cases are available in the present disclosure without restriction.

The multi-symbol set position detector 711 analyzes the control signal from the FFT processor 311 to detect the positions of the symbol to which the multi-symbol set is applied at the transmitter. For example, the multi-symbol set position detector 711 detects the positions where the multi-symbol set is applied among a series of symbols. The multi-symbol set position detector 711 provides the constellation re-configurer 713 with the position information.

The candidate multi-symbol set storage 715 is a memory for storing the modulation order to be applied to the multi-symbol sets that are predetermined in negotiation with the transmitter and the transmit power information corresponding thereto. When there are plural transmitters using different multi-symbols sets, the transmitter has to provide the receiver with the information on all available multi-symbol sets before starting data communication. Thus the receiver receives the multi-symbol set information (such as active tone arrangement, per-tone modulation orders, and transmit power information) from the transmitter and stores the received information. The candidate multi-symbol set storage 715 allows for reading and writing, because the candidate multi-symbol set storage 715 has to update data in the course of communicating with another transmitter. When the available candidate symbol sets are specified for use in the wireless communication system, all related information is stored in the candidate multi-symbol set storage 715 in the manufacturing stage of the receiver.

The information stored in the candidate multi-symbol set storage 715 includes the information on the pattern of the active tones carrying data as shown in FIG. 5B and transmit powers and modulation orders corresponding to the active tones. The values stored in the candidate multi-symbol set storage 715 are provided to the multi-symbol set constellation re-configurer 713.

The multi-symbol set constellation re-configurer 713 generates all the types of constellation diagrams for receiving signals using the information provided by the candidate multi-symbol set storage 715. The multi-symbol set constellation re-configurer 713 acquires the information on the symbol timing based on the information provided by the multi-symbol set position detector 711. Thus the multi-symbol set constellation re-configurer 713 provides the modulator 717 with the reconfigured constellation diagrams in synchronization with the corresponding timings.

The demodulator 717 performs demodulation on the symbols input from the FFT processor 311 using the reconfigured constellation diagrams provided by the multi-symbol set constellation re-configurer 713 at the demodulation timing of the multi-symbol set. When plural constellation diagrams are used, the demodulation is performed successfully with a specific constellation diagram. When the same modulation order is applied to the respective active tones of a multi-tone symbol, it is possible to acquire the modulation orders at the active tones based on the original modulation order. When the modulation order of the symbol received in the corresponding frame is 16-FQAM, the sum of the modulation orders applied to the respective active tones has to be 16-FQAM. In certain embodiments, the multi-symbol set constellation re-configurer 713 provides the demodulator 717 with only the constellation diagram reconfigured based on the corresponding modulation order and transmit power. Then the demodulator 717 can perform modulation on the symbol to which multi-symbol set is applied using just one constellation diagram.

The demodulated symbol is input to the decoder 319. Then the decoder 319 can decode the demodulated symbol successfully.

When using the receiver configured as shown in FIG. 7B, the transmitter generates a specific symbol having two or more tones carrying data which are allocated power split into the number thereof and then transmit the symbol. When using the receiver configured as shown in FIG. 7B, it is possible to mitigate interference (contamination) to the neighbor cell pilot signal which is caused by the power boosted at specific tones in the wireless communication system.

Figure 7C:
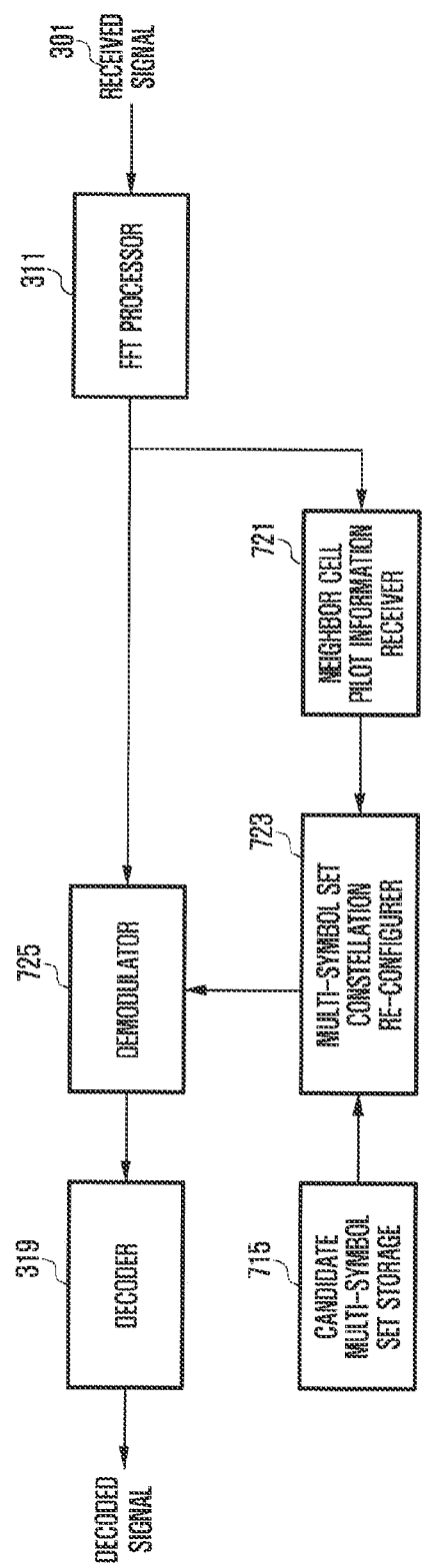
FIG. 7C illustrates a configuration of the receiver for processing received data based on the information on the neighbor cell pilot positions which are considered in use of the multi-symbol set at the transmitter according to various embodiments of the present disclosure.

FIG. 7C illustrates a configuration of the receiver for processing received data based on the information on the neighbor cell pilot positions which are considered in use of the multi-symbol set at the transmitter according to the third embodiment of the present disclosure.

Referring to FIG. 7C, the received signal 301 is input to a Fast Fourier Transform (FFT) processor 311. The FFT processor 311 processes the received signal 301 to output discrete frequency signals. Among the output signals, the control signal is input to a neighbor cell pilot information receiver 721. The data signal is input to a demodulator 725. The control signal is transmitted through a channel different in time or frequency from that of the data signal or as inserted at a specific position of the data signal. All the cases are available in the present disclosure without restriction.

The neighbor cell pilot information receiver 721 analyzes the control signal from the FFT processor 311 to acquire the information on the neighbor cell pilot positions to which multi-symbol set is applied. When the neighbor cell pilot position information is provided, this means that the information on the position to which the multi-symbol set is applied. When a neighbor cell transmits its pilot symbol at a specific position, this means that the multi-symbol set application probability is high at the corresponding symbol position. However, it may not be always to apply the multi-symbol set to the corresponding position. Since it can be understood in the same way as the first and second embodiments, detailed description thereof is omitted herein. The pilot symbol position information generated by the neighbor cell pilot information receiver 721 includes the positions of the pilot symbols of one or more neighbor cells. Since the description thereof is made in the previous embodiments, detailed description thereof is omitted herein. In this way, the neighbor cell pilot information receiver 721 is capable of acquiring neighbor cell(s) pilot position information and providing the multi-symbol set constellation re-configurer 723 with the neighbor cell(s) pilot position information.

The candidate multi-symbol set storage 715 is a memory for storing the modulation order to be applied to the multi-symbol sets that are predetermined in negotiation with the transmitter and the transmit power information corresponding thereto. When there are plural transmitters using different multi-symbols sets, the transmitter has to provide the receiver with the all available multi-symbol sets before starting data communication. Thus the receiver receives the multi-symbol set information (such as active tone arrangement, per-tone modulation orders, and transmit power information) from the transmitter and stores the received information. The candidate multi-symbol set storage 715 allows reading and writing, because the candidate multi-symbol set storage 715 has to update data in the course of communicating with another transmitter. When the available candidate symbol sets information is specified for use in the wireless communication system, all related information is stored in the candidate multi-symbol set storage 715 in the manufacturing stage of the receiver.

The information stored in the candidate multi-symbol set storage 715 includes the information on the pattern of the active tones carrying data as shown in FIG. 5B and transmit powers and modulation orders corresponding to the active tones. The values stored in the candidate multi-symbol set storage 715 are provided to the multi-symbol set constellation re-configurer 723.

The multi-symbol set constellation re-configurer 723 generates all the types of constellation diagrams for receiving signals using the information provided by the candidate multi-symbol set storage 715. The multi-symbol set constellation re-configurer 723 acquires the information on the symbol timing based on the neighbor cell pilot position information provided by the neighbor cell pilot information receiver 721. Thus the multi-symbol set constellation re-configurer 723 provides the modulator 725 with the reconfigured constellation diagrams in synchronization with the corresponding timings.

The demodulator 725 performs demodulation on the symbols input from the FFT processor 311 using the reconfigured constellation diagram provided by the multi-symbol set constellation re-configurer 723 at the demodulation timing of the multi-symbol set. When plural constellation diagrams are used, the demodulation is performed successfully with a specific constellation diagram. When the same modulation order is applied to the respective active tones of a multi-tone symbol, it is possible to acquire the modulation orders at the active tones based on the original modulation order. When a series of symbols exist in a frame, the same modulation order is applied in the corresponding frame. When the modulation order of the symbol received in the corresponding frame is 16-FQAM, the sum of the modulation orders applied to the respective active tones has to be 16-FQAM. In certain embodiments, the multi-symbol set constellation re-configurer 723 provides the demodulator 725 with only the constellation diagram reconfigured based on the corresponding modulation order and transmit power. Then the demodulator 725 can perform modulation on the symbol to which multi-symbol set is applied using just one constellation diagram.

The demodulated symbol is input to the decoder 319. Then the decoder 319 can decode the demodulated symbol successfully.

When using the receiver configured as shown in FIG. 7C, the transmitter generates a specific symbol having two or more tones carrying data which are allocated power split into the number thereof and then transmit the symbol. When using the receiver configured as shown in FIG. 7C, it is possible to mitigate interference (contamination) to the neighbor cell pilot signal which is caused by the power boosted at specific tones in the wireless communication system.

Figure 7D:
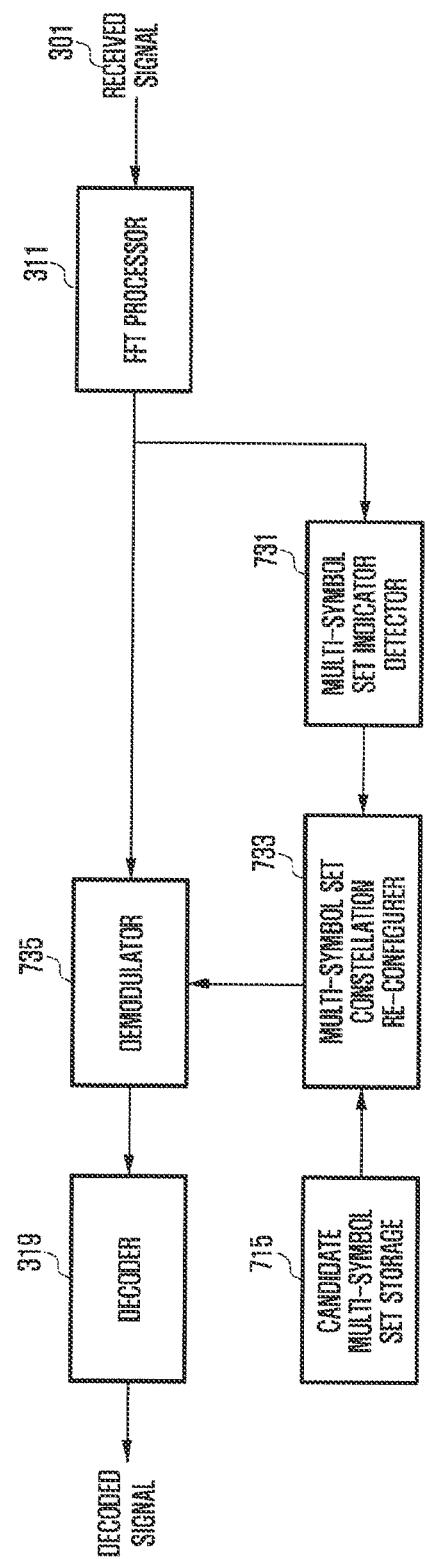
FIG. 7D illustrates a configuration of the receiver for processing received data based on the information on whether a multi-symbol set is used at the transmitter according to various embodiments of the present disclosure.

FIG. 7D is a block diagram illustrating a configuration of the receiver for processing received data based on the information on whether a multi-symbol set is used at the transmitter according to the third embodiment of the present disclosure.

Referring to FIG. 7D, the received signal 301 is input to a Fast Fourier Transform (FFT) processor 311. The FFT processor 311 processes the received signal 301 to output discrete frequency signals. Among the output signals, the control signal is input to a multi-symbol set indicator detector 731. The data signal is input to a demodulator 735. The control signal is transmitted through a channel different in time or frequency from that of the data signal or as inserted at a specific position of the data signal. All the cases are available in the present disclosure without restriction.

The multi-symbol set indicator detector 731 analyzes the control signal from the FFT processor 311 to detect a multi-symbol set indicator and acquire the information on whether multi-symbol set is used based on the multi-symbol set indicator. The multi-symbol set indicator is a 1-bit indicator to indicate whether there is any symbol to which the multi-symbol set is applied among the symbols transmitted by the transmitter. For example, the multi-symbol set indicator indicates whether there is any symbol to which a multi-symbol set is applied among a series of symbols transmitted by the transmitter or whether the transmitter transmits the data symbol to which a multi-symbol set is applied to all the receivers.

The multi-symbol set indicator detector 731 determines whether the multi-symbol set is used based on the multi-symbol set indicator and outputs the determination result to the multi-symbol set constellation re-configurer 733. When the multi-symbol set indicator indicates no use of the multi-symbol set, the multi-symbol set constellation re-configurer 733 may not perform constellation diagram reconfiguration. Otherwise when the multi-symbol set indicator indicates the use of the multi-symbol set, the multi-symbol set constellation re-configurer 733 generates the constellation diagram corresponding to the use of the multiple tones. When the demodulator 735 has the original constellation diagram and thus it is not necessary for the multi-symbol set constellation re-configurer 733 to provide the demodulator 735 with the original constellation diagram, the output of the multi-symbol set indicator detector 731 is the signal of controlling on/off of the multi-symbol set constellation re-configurer 733.

The candidate multi-symbol set storage 715 is a memory for storing modulation orders applicable to the multi-symbol sets that are predetermined in negotiation with the transmitter and the transmit powers corresponding thereto. When there are plural transmitters using different multi-symbols sets, the transmitter has to provide the receiver with the information on all available multi-symbol sets before starting data communication. Thus the receiver receives the multi-symbol set information (such as active tone arrangement, per-tone modulation orders, and transmit power information) from the transmitter and stores the received information. The candidate multi-symbol set storage 715 allows reading and writing, because the candidate multi-symbol set storage 715 has to update data in the course of communicating with another transmitter. When the available candidate symbol sets are specified for use in the wireless communication system, all related information is stored in the candidate multi-symbol set storage 715 in the manufacturing stage of the receiver.

The information stored in the candidate multi-symbol set storage 715 includes the information on the pattern of the active tones carrying data as shown in FIG. 5B and transmit powers and modulation orders corresponding to the active tones. The values stored in the candidate multi-symbol set storage 715 are provided to the multi-symbol set constellation re-configurer 733.

The multi-symbol set constellation re-configurer 733 generates all the types of constellation diagrams for receiving signals using the information provided by the candidate multi-symbol set storage 715. The multi-symbol set constellation re-configurer 733 provides the modulator 735 with the reconfigured constellation diagrams based on the information on whether the multi-symbol set is used which is provided by the multi-symbol set indicator detector 731.

The demodulator 735 performs demodulation on the symbols input from FFT processor 311 using the constellation diagrams reconfigured by the multi-symbol set constellation re-configurer 733. When plural constellation diagrams are used, the demodulation is performed successfully with a specific constellation diagram. When a series of symbols exist in a frame, the same modulation order is applied in the corresponding frame. When the modulation order of the symbol received in the corresponding frame is 16-FQAM, the sum of the modulation orders applied to the respective active tones has to be 16-FQAM. In certain embodiments, the multi-symbol set constellation re-configurer 733 provides the demodulator 735 with only the constellation diagram reconfigured based on the corresponding modulation order and transmit power. Then the demodulator 735 can perform modulation on the symbol using the original constellation diagram and the constellation diagram available when the multi-symbol set is applied.

The demodulated symbol is input to the decoder 319. Then the decoder 319 can decode the demodulated symbol successfully.

When using the receiver configured as shown in FIG. 7D, the transmitter generates a specific symbol having two or more tones carrying data which are allocated power split into the number thereof and then transmit the symbol. When using the receiver configured as shown in FIG. 7D, it is possible to mitigate interference (contamination) to the neighbor cell pilot signal which is caused by the power boosted at specific tones in the wireless communication system.

The descriptions have been made of the cases of using the multi-symbol set according to the third embodiment hereinabove, the case of using the multi-symbol set having specific tones carrying data as exemplified in FIGS. 5A and 5B to which the modulation order which is lower than the original modulation order is applied. The tones are arranged in an extended or shrunk format as compared to the case of FIGS. 5A and 5B. The transmitter transmits the multi-symbol sets configured for such cases. Also, the configurations and operations of the receivers that are suited for the information provided by the transmitter which configures and transmits the multi-symbol set are described. Although certain components arranged at the same position in the respective drawings are described with different reference numbers, they are implemented in the form of identical devices. For example, since the control channel receiver 601 of FIG. 7A, the multi-symbol set position detector 711 of FIG. 7B, the neighbor cell pilot information receiver of FIG. 7C, the multi-symbol set indicator detector 731 of FIG. 7C, and the multi-symbol set indicator detector of FIG. 7D are all receiving information through the control channel, they can be referred to as "control channel receiver". It should be noted that the reason for using different reference numbers and names in FIGS. 7A to 7D is to help understand the functional operations thereof.

Likewise, the multi-symbol set constellation re-configurers 703, 713, 723, and 733 of FIGS. 7A to 7D are referred to as "constellation converter." It should be noted that the reason for using different reference numbers and names is to help understand the functional operations thereof. This holds true to the cases of the demodulator.

<The Fourth Embodiment>

The fourth embodiment of the present disclosure is directed to a method of mitigation interference to neighbor cell pilot signals when using the FQAM (as a hybrid modulation scheme) and a QAM scheme. In certain embodiments, the transmitter transmits a FQAM symbol as a hybrid modulation symbol in the normal situation and a QAM symbol in a case required to mitigate interference. Prior to explain the configurations of the receiver, descriptions are made of the cases of using the FQAM modulation symbol and QAM modulation symbol. In certain embodiments, the FQAM symbol as the pre-conversion symbol and the QAM symbol as the post-conversion symbol should be identical in number of information bits per tone. A detailed description thereof is made hereinafter with reference to FIG. 8.

Figure 8:
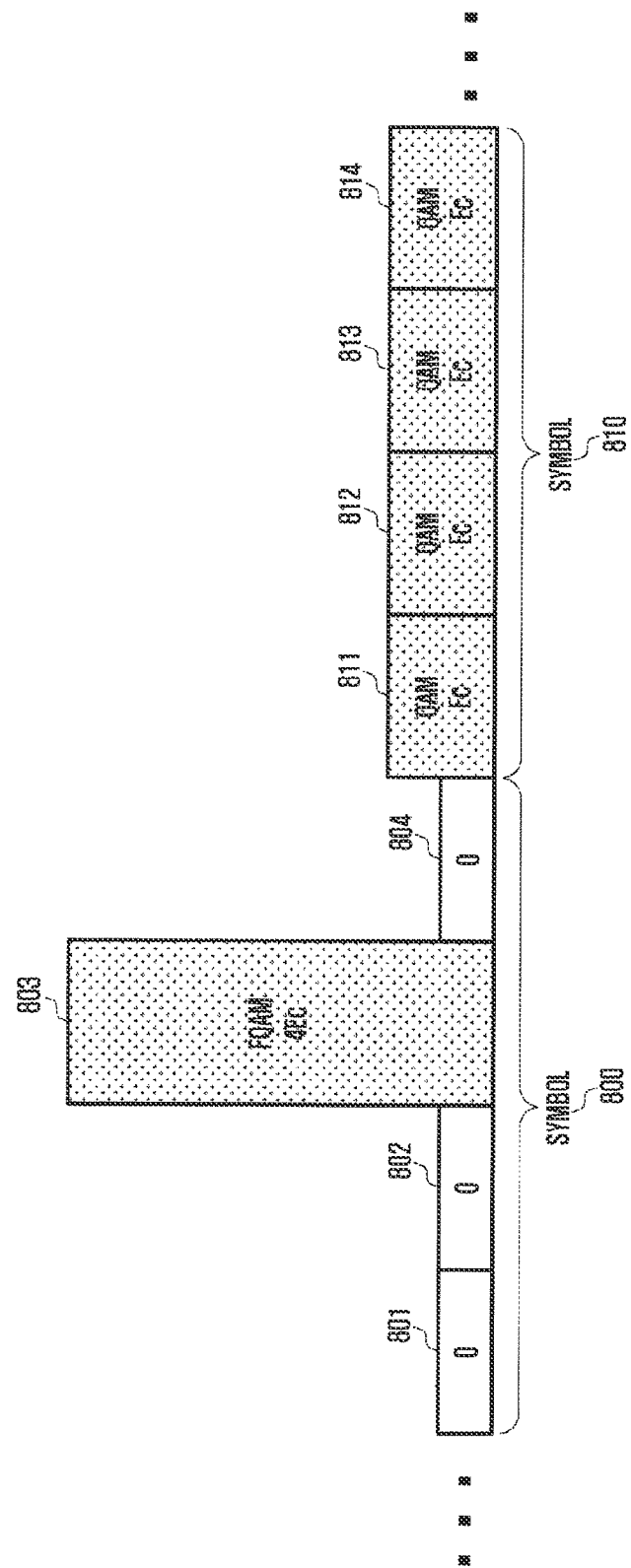
FIG. 8 illustrates a configuration of symbols in the system using the FQAM and QAM schemes according to various embodiments of the present disclosure.

FIG. 8 illustrates a configuration of symbols in the system using the FQAM and QAM schemes according to the fourth embodiment of the present disclosure.

FIG. 8 exemplifies a case of transmitting two different symbols 800 and 810 in sequence. Reference number 800 denotes the symbol configured for use in the FQAM mode. As shown in FIG. 8, each of the first and second symbols 800 and 810 consists of four tones (i.e. tones 801, 802, 803, and 804 of the first symbol 800; and tones 811, 812, 813, and 814 of the second symbol 810).

The third tone 803 carrying data in the first symbol 800 is the tone modulated in the FQAM mode and transmitted at transmit power of 4Ec. The rest tones 801, 802, and 804 of the first symbol 800 are allocated no transmit power and carry no data. When a neighbor cell pilot signal is transmitted in the second symbol, the transmitter applies a QAM mode to the respective tones with the distribution of the data instead of applying the FQAM mode to avoid interference to the neighbor cell pilot signal. The transmit power at each of the tones 811, 812, 813, and 814 of the second symbol 810 is Ec.

When there is no neighbor cell pilot signal following the second symbol, the subsequent signal is transmitted in the same form as the first symbol. However, the position of the tone carrying data changes.

When transmitting data using the FQAM and QAM schemes as shown in FIG. 8, the transmitter has to inform the receiver of the use of both the FQAM and QAM schemes. When using the method of FIG. 8, the transmitter provides the receivers with the information as follows.

First, the transmitter transmits to the receiver the information on the position of the symbol of which modulation scheme is changed from the FQAM to QAM when both the FQAM and QAM schemes are in use.

Second, the transmitter transmits to the receiver the information on the neighbor cell pilot position considered for use of both the FQAM and QAM schemes.

Third, the transmitter transmits to the receiver the information that the FQAM and QAM schemes are being used when both the FQAM and QAM schemes are in use.

Figure 9A:
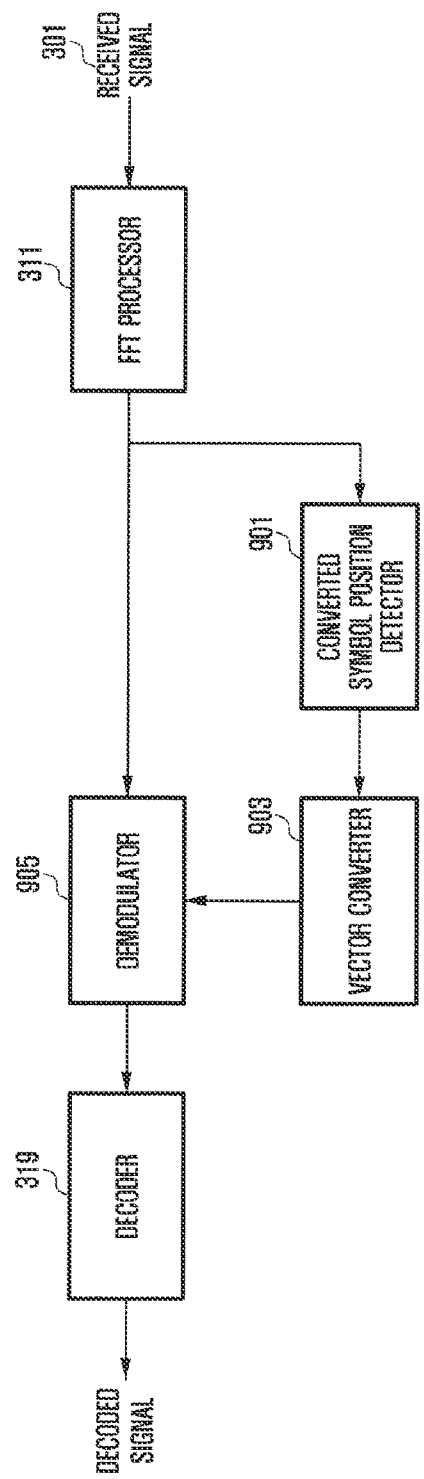
FIG. 9A illustrates a configuration of the receiver for processing received data based on the information on the position of the symbol of which modulation scheme is changed from FQAM to QAM according to various embodiments of the present disclosure.

FIG. 9A is a block diagram illustrating a configuration of the receiver for processing received data based on the information on the position of the symbol of which modulation scheme is changed from FQAM to QAM according to the fourth embodiment of the present disclosure.

Referring to FIG. 9A, the received signal 301 is input to a Fast Fourier Transform (FFT) processor 311. The FFT processor 311 processes the received signal 301 to output discrete frequency signals. Among the output signals, the control signal is input to a converted symbol position detector 901. The data signal is input to a demodulator 905. The control signal is transmitted through a channel different in time or frequency from that of the data signal or as inserted at a specific position of the data signal. All the cases are available in the present disclosure without restriction.

The converted symbol position detector 901 analyzes the control signal from the FFT processor 311 to detect the position of the symbol of which modulation scheme is changed from FQAM to QAM. For example, the converted symbol position detector 901 detects the symbol of which modulation scheme is changed from FQAM to QAM to mitigate interference to signals of other transmitters such as pilot signal of the neighbor cells as shown in FIG. 8.

The vector converter 903 generates a constellation diagram for QAM scheme instead of the FQAM scheme. The vector converter 903 provides the demodulator 905 with the constellation diagram for the QAM in correspondence to the converted symbol position information provided by the converted symbol position detector 901. The vector convertor 905 provides the demodulator 905 with the QAM constellation diagram at the corresponding symbol demodulation position or the QAM modulation symbol reception timing information and QAM constellation diagram in advance.

Thus when the normal FQAM symbol is received from the FFT processor 311, the demodulator 905 can demodulate the received symbol in the FQAM mode. When the QAM symbol is received from the vector converter 903 at a specific timing, i.e. when the QAM constellation diagram to be applied to the QAM symbol is received, the demodulator 905 can demodulate the QAM symbol. The demodulated symbol is input to the decoder 319. Thus the decoder 319 decodes the demodulated signal successfully.

When using the receiver configured as shown in FIG. 9A, the transmitter transmits the data modulated in a QAM mode having the low modulation order at the pilot positions of the neighbor cells so as to mitigate the interference (contamination) to the neighbor cell pilot signal which is caused by the boosted power thereat.

Figure 9B:
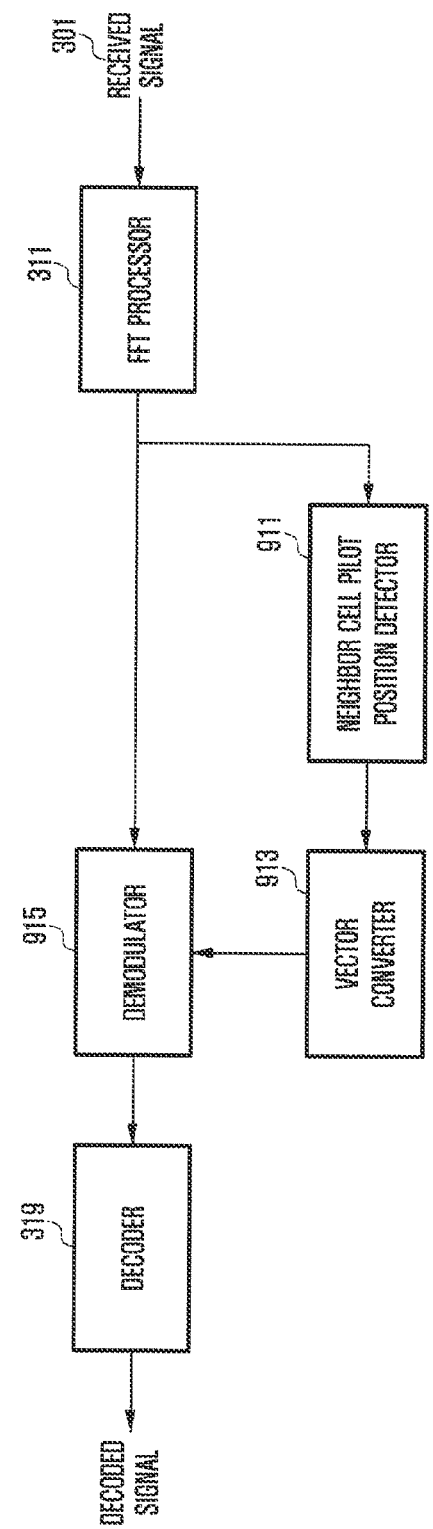
FIG. 9B illustrates a configuration of the receiver for processing received data based on the information on neighbor cell pilot position considered when the transmitter uses both the FQAM and QAM schemes according to various embodiments of the present disclosure.

FIG. 9B is a block diagram illustrating a configuration of the receiver for processing received data based on the information on neighbor cell pilot position considered when the transmitter uses both the FQAM and QAM schemes according to the fourth embodiment of the present disclosure.

Referring to FIG. 9B, the received signal 301 is input to a Fast Fourier Transform (FFT) processor 311. The FFT processor 311 processes the received signal 301 to output discrete frequency signals. Among the output signals, the control signal is input to a neighbor cell pilot position detector 911. The data signal is input to a demodulator 915. The control signal is transmitted through a channel different in time or frequency from that of the data signal or as inserted at a specific position of the data signal. All the cases are available in the present disclosure without restriction.

The neighbor cell pilot position detector 911 analyzes the control signal from the FFT processor 311 to detect the neighbor cell pilot positions to which the QAM scheme is applied instead to the FQAM scheme. The transmitter uses the QAM scheme instead of the FQAM scheme at the neighbor cell pilot symbol position or not. When the neighbor cell pilot position is detected, this means that the QAM scheme can be applied to the corresponding position instead of the FQAM scheme. The neighbor cell pilot position detector 911 provides the vector converter 913 with the information on the neighbor cell pilot position.

The vector converter 913 generates the constellation diagram converted with QAM vector for use in the QAM scheme instead of the FQAM scheme. The vector convertor 913 provides the demodulator 915 with the constellation diagram with the QAM vector which is generated based on the neighbor cell pilot position information provided by the neighbor cell pilot position detector 911. The vector convertor 913 provides the demodulator 915 with the QAM constellation diagram at the corresponding symbol demodulation position, or the QAM modulation symbol reception timing information and QAM constellation diagram in advance. When the demodulator 915 has the constellation diagram for demodulating the original FQAM symbol, the vector converter 913 provides the demodulator 915 with only the converted information and, otherwise when the demodulator 915 has no constellation diagram for demodulating the original FQAM symbol, the constellation diagram for demodulating the FQAM symbol along with.

When the original FQAM symbol is input from the FFT processor 311, the demodulator 915 demodulates the FQAM symbol with the FQAM scheme. The demodulator 915 tries demodulation on the symbol received at a specific timing, e.g. at the neighbor cell pilot position, using both the QAM and FQAM constellation diagrams. When the received symbol is the QAM symbol, the demodulation is performed with the QAM constellation diagram and, otherwise when the received signal is the FQAM symbol, the demodulation is performed with the FQAM constellation diagram. The demodulated symbol is input to the decoder 319. Then the decoder 319 can decode the demodulated signal successfully.

When using the receiver configured as shown in FIG. 9B, the transmitter transmits the data modulated in a QAM mode having the low modulation order at the pilot positions of the neighbor cells so as to mitigate the interference (contamination) to the neighbor cell pilot signal which is caused by the boosted power thereat.

Figure 9C:
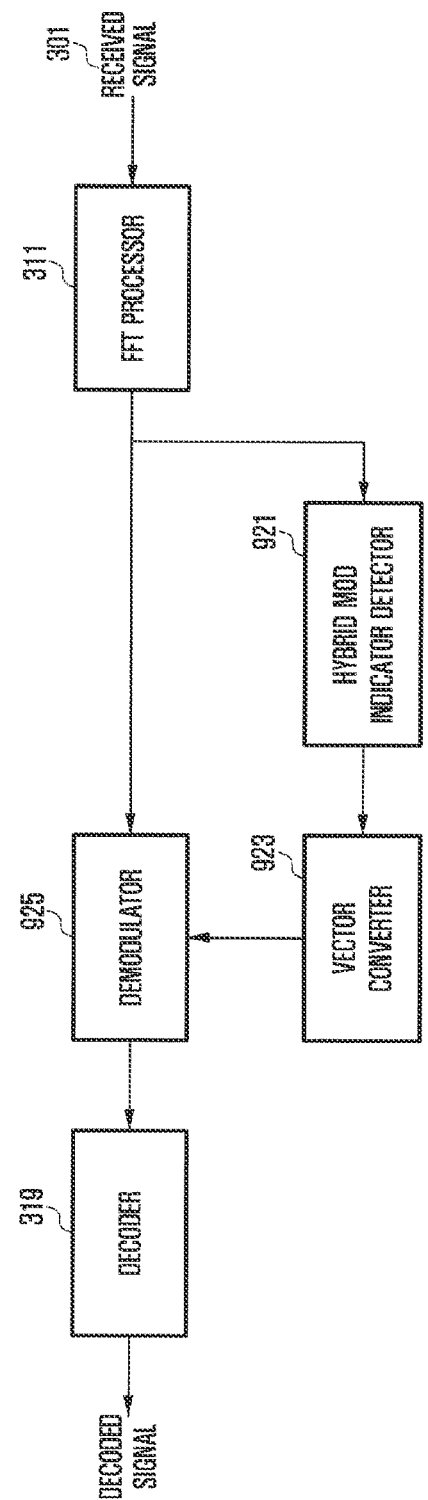
FIG. 9C illustrates a configuration of the receiver for processing received data based on the information that both the FQAM and QAM schemes are being used when the transmitter uses the FQAM and QAM schemes according to various embodiments of the present disclosure.

FIG. 9C illustrates a configuration of the receiver for processing received data based on the information that both the FQAM and QAM schemes are being used when the transmitter uses the FQAM and QAM schemes according to the fourth embodiment of the present disclosure.

Referring to FIG. 9C, the received signal 301 is input to a Fast Fourier Transform (FFT) processor 311. The FFT processor 311 processes the received signal 301 to output discrete frequency signals. Among the output signals, the control signal is input to a hybrid mode indicator detector 921. The data signal is input to a demodulator 925. The control signal is transmitted through a channel different in time or frequency from that of the data signal or as inserted at a specific position of the data signal. All the cases are available in the present disclosure without restriction.

The hybrid mode indicator detector 921 analyzes the control signal from the FFT processor 311 to determine whether both the FQAM and QAM schemes are used. The transmitter user both the FQAM and QAM schemes for a specific receiver or all receivers. Accordingly, the hybrid mode indicator is used to indicate whether both the FQAM and QAM schemes are used for a specific receiver or all receivers. The hybrid mode indicator detector 921 provides the vector converter 923 with the information indicating that both the FQAM and QAM schemes are used.

The vector converter 923 generates the constellation diagram converted with the QAM vector for use in the QAM mode instead of the FQAM mode. The vector convertor 923 does not distinguish between the FQAM and QAM symbols positions. Thus the vector converter 923 provides the demodulator with the constellation diagrams for modulating the FQAM and QAM symbols. When the demodulator 925 has the constellation diagram for demodulating the FQAM symbol, the vector converter 923 may not provide the demodulator 925 with the constellation diagram for demodulating the FQAM symbol.

Then the demodulator 925 tries demodulation on all the symbols with the FQAM and QAM constellation diagrams. When the received symbol is the FQAM symbol, the demodulation is performed successfully with the FQAM constellation diagram and, otherwise when the received symbol is the QAM symbol, with the QAM constellation diagram. The demodulated symbol is input to the decoder 319. Then the decoder 319 can decode the demodulated signal successfully.

When using the receiver configured as shown in FIG. 9C, the transmitter provides the receiver with the information on whether both the FQAM and QAM schemes are used. The transmitter also transmits the data modulated in a QAM mode having the low modulation order at the pilot positions of the neighbor cells so as to mitigate the interference (contamination) to the neighbor cell pilot signal which is caused by the boosted power thereat.

The descriptions have been made of the cases of using two modulation schemes, i.e. the FQAM and QAM schemes, according to the fourth embodiment hereinabove. When using both the FQAM and QAM schemes, the modulation order of the QAM scheme is determined depending on the modulation scheme of the FQAM scheme. Although certain components arranged at the same position in the respective drawings are described with different reference numbers, they are implemented in the form of identical devices. For example, since the converted symbol position detector 901 of FIG. 9A, the neighbor cell pilot position detector 911 of FIG. 9B, and the hybrid mode indicator detector 921 of FIG. 9C are all receiving information through the control channel, they can be referred to as "control channel receiver." It should be noted that the reason for using different reference numbers and names in FIGS. 9A to 9C is to help understand the functional operations thereof.

The vector convertors 903, 913, and 923 of FIGS. 9A to 9C are referred to as "constellation converters." It should be noted that the reason for using different reference numbers and names is to help understand the functional operations thereof. This holds true to the cases of the demodulator.

<The Fifth Embodiment>

The fifth embodiment of the present disclosure is directed to a method of using the power-down mode of the first embodiment and the multi-symbol set mode of the third embodiment simultaneously. Even in certain embodiments, the transmitter transmits data modulated with the FQAM in the normal situation and a changed modulation scheme in a predetermined situation, e.g. when it is necessary to mitigate interference to the neighbor cell pilot signal. When the transmitter uses the power-down mode of the first embodiment and the multi-symbol set mode of the third embodiment simultaneously, the modulation orders at the active tones belonging to one symbol is set to be different from the modulation order of the original symbol.

Descriptions are made of the configurations and operations of the receiver in association with the transmitter operating as above. When using the power-down mode of the first embodiment and the multi-symbol set mode of the third embodiment simultaneously, the transmitter provides the receiver with a power-down factor and multi-symbol set index, a power-down symbol and power-down symbol index, and symbol position information. The configuration of the receiver for certain embodiments is described with reference to FIG. 10.

Figure 10:
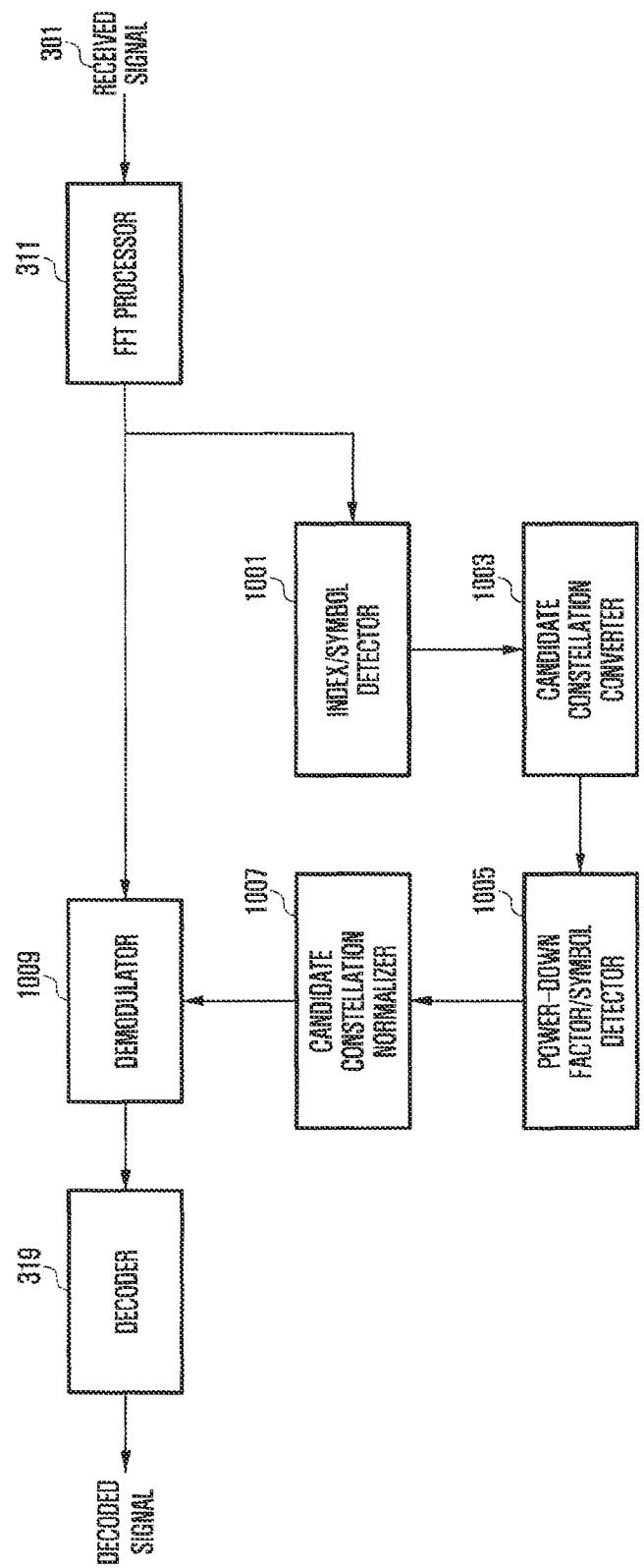
FIG. 10 illustrates a configuration of the receiver for the case of using the power-down mode and multi-symbol set mode according to various embodiments of the present disclosure.

FIG. 10 is a block diagram illustrating a configuration of the receiver for the case of using the power-down mode and multi-symbol set mode according to the fifth embodiment of the present disclosure.

Referring to FIG. 10, the received signal 301 is input to a Fast Fourier Transform (FFT) processor 311. The FFT processor 311 processes the received signal 301 to output discrete frequency signals. Among the output signals, the control signal is input to an index/symbol detector 1001. The data signal is input to a demodulator 1009. The control signal is transmitted through a channel different in time or frequency from that of the data signal or as inserted at a specific position of the data signal. All the cases are available in the present disclosure without restriction.

The index/symbol detector 1001 acquires the multi-symbol set index and position of the FQAM symbol to which the corresponding set is applied. Since the multi-symbol set index has already been described in the third embodiment, detailed description thereof is omitted herein. The index/symbol detector 1001 provides the candidate constellation convertor 1003 with the multi-symbol set index and the information on the position of the FQAM symbol to which the corresponding set is applied.

The candidate constellation convertor 1003 converts the candidate constellation diagrams of the FQAM symbol to which the multi-symbol set is applied to a constellation to which the corresponding set belongs. For example, the candidate constellation converter 1003 generates or modifies the constellation diagram which can be used with the multi-symbol set among the various constellation diagrams. When the candidate constellation converter 1003 has an internal memory (not shown) storing all available constellation diagrams, the constellation converter 1003 can be configured to read out a constellation diagram to be applied to the corresponding multi-symbol set. The candidate constellation converter 1003 provides the power down factor/symbol detector 1005 with the selected constellation diagram.

The power down factor/symbol detector 1005 checks the power-down factor and power-down FQAM symbol position received through the control channel. The power-down factor/symbol detector 1005 is configured to be integrated into a control channel receiver along with the index/symbol detector 1001. The configuration of the control channel receiver is described later.

The power-down factor/symbol detector 1005 provides the candidate constellation normalizer 1007 with the acquired power-down factor and power-down symbol position. The power-down factor/symbol detector 1005 also provides the candidate constellation normalizer 1007 with the constellation diagram provided by the candidate constellation converter 1003 together.

Thus the candidate constellation normalizer 1007 receives the information on the power-down factor, power-down factor-applied symbol position, and constellation diagram to be used in modulation. The candidate constellation normalizer 1007 normalizes the constellation diagram based on the power-down factor information. For example, when the power-down factor is one half, the candidate constellation normalizer 1007 normalizes the value of the constellation diagram to be one half; and when the power-down factor is one fourth, the candidate constellation normalizer 1007 normalizes the value of the constellation diagram to be one fourth. Afterward, the candidate constellation normalizer 1007 provides the demodulator 1009 with the multi-symbol set information and normalized constellation diagram information at the corresponding symbol position.

The demodulator 1009 performs demodulation on the normal symbol input from the FFT processor 311 in the FQAM mode. When the active tone arrangement information and constellation diagram to be applied to a symbol at a specific position is received from the candidate constellation normalizer 1007, the demodulator 1009 performs demodulation on the corresponding symbol based on the received information. The demodulated symbol is input to the decoder 319. Then the decoder 319 can decode the demodulated signal successfully.

When using the receiver configured as shown in FIG. 10, the transmitter provides the receiver with only the information on whether the power-down mode and the multi-symbol set mode are used simultaneously. The transmitter transmits the data modulated in a QAM mode having the low modulation order at the pilot positions of the neighbor cells so as to mitigate the interference (contamination) to the neighbor cell pilot signal which is caused by the boosted power thereat.

Figure 11:
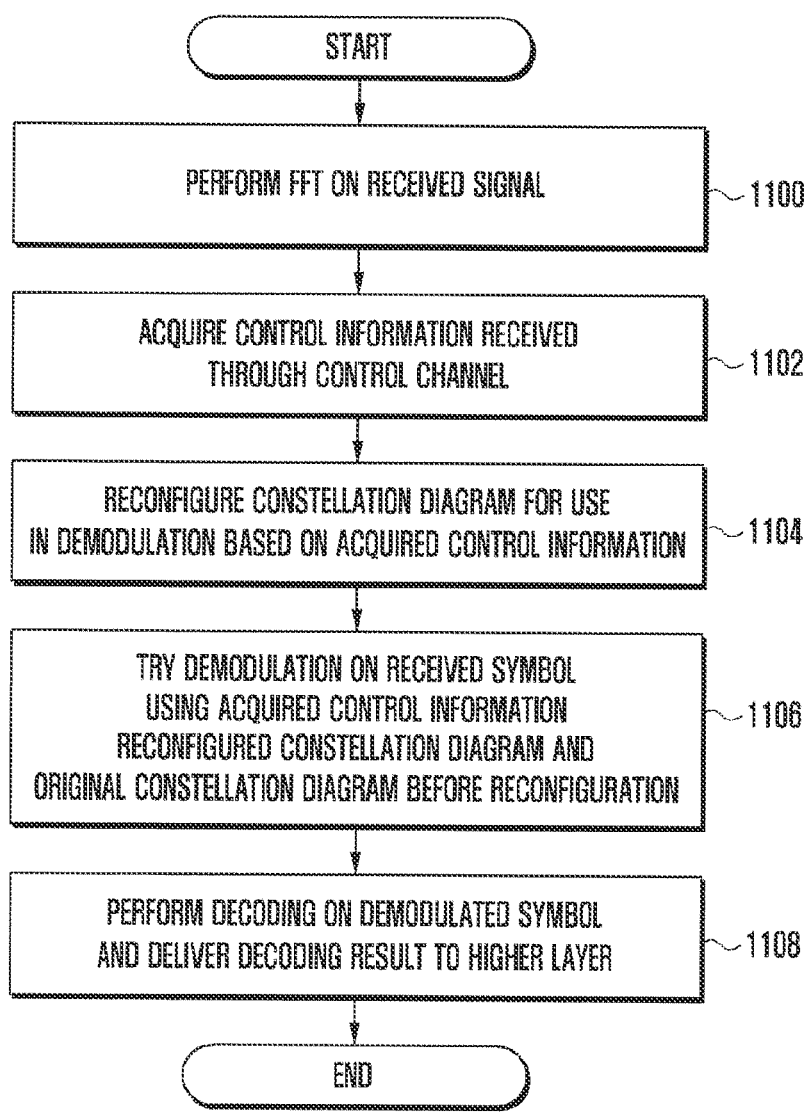
FIG. 11 illustrates a received data processing procedure of the receiver according to various embodiments of the present disclosure.

FIG. 11 is a flowchart illustrating a received data processing procedure of the receiver according to various embodiments of the present disclosure.

Referring to FIG. 11, the receiver performs FFT on the signal received from the transmitter by means of the FFT processor 311 at operation 1100. The receiver acquires the control information transmitted by the transmitter through the control channel at operation 1102. The control information includes various types of information as described in the first to fifth embodiments. Since the various types of information have been described in the above embodiments, detailed descriptions thereof are omitted herein.

The receiver reconfigures the constellation diagram to be used in modulation process based on the information acquired through the control channel at operation 1104. For example, when the power-down mode is used, the receiver reconfigures the constellation diagram based on the power-down factor; when the multi-tone mode is used, the receiver reconfigures the constellation diagram based on the multi-tone arrangement and per-tone transmit powers; when the multi-symbol set is used, the receiver reconfigures the constellation diagram based on the modulation order changed according to the multi-symbol set, tone arrangement, and power-down information; and when the FQAM and QAM schemes are used simultaneously, the receivers generates the constellation diagrams for the respective modulation schemes. At operation 1104, the reconfigured constellation diagram is provided to the demodulator for use in modulation at every symbol or at a specific symbol.

Then the demodulator performs demodulation in match with the corresponding symbol using the information received through the control channel and the original and reconfigured constellation diagrams at operation 1106. For example, the decoder performs demodulation on the hybrid modulation mode symbol with the original constellation diagram and the changed modulation mode symbol with the reconfigured constellation diagram. When it is impossible to check the symbol modulated in the changed modulation mode, the demodulator of the receiver tries modulations on all the symbols with the original and reconfigured constellation diagrams.

Next, the receiver performs decoding on the demodulated symbol and delivers the decoding result to the higher layer at operation 1108.

FIG. 12 illustrates a power-down recovery procedure of the receiver according to various embodiments of the present disclosure.

Referring to FIG. 12, the receiver performs FFT on the signal received from the transmitter by means of the FFT processor 311 to output frequency information at step 1200. The receiver acquires control information transmitted through the control channel among the converted information at step 1202. The control information includes the power-down information and power-down symbol position information that are described in the first embodiment.

Then the receiver compensates the power of the received symbol based on the power-down information received through the control channel at step 1204. Once the power is compensated, the symbol is recovered to the structure of the normal hybrid modulation symbol. Thus the demodulator of the receiver demodulates the received symbol at step 1206 and then the decoder decodes the demodulated symbol at step 1208.

A description is made of the case where the index/symbol detector 1001 and the power-down factor/symbol detector 1005 are integrated in the control channel receiver. The control channel receiver acquires the multi-symbol set index and FQAM symbol position in the corresponding set based on the information received through the control channel and the power-down factor information and power-down factor-applied symbol position information based on the information received through the control channel. The position of the FQAM symbol in which multi-symbol set is used is the same position as the symbol to which the power down-factor is applied.

The information processed by the control channel receiver is input to the candidate constellation converter 1003. The candidate constellation convertor 1003 and the candidate constellation normalizer 1007 are implemented as a single device. The constellation converter generates, modifies, or reads the constellation diagram to be applied to the corresponding set among the candidate constellation diagrams of the FQAM symbol to which the corresponding set is applied using the multi-symbol set index provided by the control channel receiver. Then the constellation converter normalizes the constellation diagram to be applied to the FQAM symbol using the power-down factor. The normalized constellation diagram, multi-symbol set index, and position information is provided to the demodulator.

The reason why the two blocks are extended to 4 blocks in FIG. 10 is to propose various embodiments and help understand the present disclosure.

As described above, the signal demodulation method and apparatus of the present disclosure is advantageous in terms of mitigating interference to the pilot signals of neighbor cells by modifying the hybrid modulation symbol transmitted in a wireless communication system using a hybrid modulation scheme. Also, the signal demodulation method and apparatus of the present disclosure is advantageous in that the receiver is capable of decoding the hybrid modulation symbol which is modified to mitigate interference to the pilot signal of a neighbor cell normally using the information provided by the transmitter.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus of demodulating a modulation symbol received in a wireless communication system using a hybrid modulation scheme, the apparatus comprising:
 a control channel receiver configured to acquire a hybrid modulation scheme change information from a control information received through a control channel;
 a constellation re-configurer configured to reconfigure a constellation diagram for use in demodulation with the hybrid modulation scheme change information provided by the control channel receiver; and
 a demodulator configured to demodulate a hybrid modulation symbol and a modified hybrid modulation symbol input when a reconfigured constellation diagram is received from the constellation re-configurer based on the reconfigured constellation diagram.

2. The apparatus of claim 1, wherein the hybrid modulation scheme change information comprises a power-down factor at a tone carrying data in the hybrid modulation symbol and a position at which the power-down factor is applied, and the constellation re-configurer is further configured to normalize the constellation diagram to be used for modulation using the power-down factor and output the normalized constellation diagram to the demodulator in synchronization with a position of the modified hybrid modulation symbol to which the power-down factor is applied.

3. The apparatus of claim 1, wherein the hybrid modulation scheme change information comprises a modified hybrid modulation symbol position information, and the constellation re-configurer is further configured to reconfigure the constellation diagrams for use in demodulation, using previously stored power-down factors and output the reconfigured constellation diagrams to the demodulator at positions of the modified hybrid modulation symbols.

4. The apparatus of claim 1, wherein the hybrid modulation scheme change information comprises positions at which power-down of the hybrid modulation symbol is considered, and the constellation re-configurer is further configured to reconfigure the constellation diagrams for use in demodulation using previously stored power-down factors and output the reconfigured constellation diagrams to the demodulator at positions to which power-down of the hybrid modulation symbols is considered.

5. The apparatus of claim 2, wherein the positions to which a power-down of the hybrid modulation symbols is considered as a pilot symbol position of neighbor cells.

6. The apparatus of claim 1, wherein the hybrid modulation scheme change information comprises an indicator indicating whether the modified hybrid modulation symbol exists, the constellation re-configurer is further configured to reconfigure constellation diagrams for use in modulation using previously stored power-down factors, and output the constellation diagram to the demodulator, and the demodulator is further configured to try demodulation on all received symbols using the reconfigured constellation diagrams and original diagrams before being reconfigured.

7. The apparatus of claim 1, wherein the hybrid modulation scheme change information comprises positions to which power-down of the hybrid modulation symbol is considered, the constellation re-configurer is further configured to reconfigure the constellation diagrams for use in modulation using power-down factors, and output the reconfigured constellation diagrams to the demodulator at the positions to which power-down of the hybrid modulation symbols is considered, and the demodulator is further configured to try, when the reconfigured constellation diagrams are received, demodulation on the input symbol using the reconfigured constellation diagrams and constellation diagrams before the reconfiguration.

8. The apparatus of claim 7, wherein the positions to which power-down of the hybrid modulation symbols are considered as pilot symbol positions of neighbor cells.

9. The apparatus of claim 1, wherein the hybrid modulation scheme change information comprises a power-down factor of a tone carrying data in the hybrid modulation symbol, the constellation re-configurer is further configured to normalize the constellation diagrams for use in demodulation using a power-down factor, and output the normalized constellation diagrams to the demodulator, and the demodulator is further configured to try demodulation on all input symbols using the normalized constellation diagrams and the constellation diagrams before normalization.

10. The apparatus of claim 1, wherein the modified hybrid modulation symbol is a symbol comprising at least two tones that carry data in same modulation scheme as tones of the hybrid modulation symbol and comprise transmit powers reduced as compared to the hybrid modulation symbol.

11. The apparatus of claim 10, wherein the hybrid modulation scheme change information comprises a multi-tone set index indicating modified hybrid modulation symbol's position and arrangement and powers of tones carrying data in the modified hybrid modulation symbol, and the constellation re-configurer is further configured to reconfigure the constellation diagrams in correspondence to powers allocated to respective tones in the modified hybrid modulation symbol and output the reconfigured constellation diagrams and tone arrangement information of the modified hybrid modulation symbol to the demodulator in synchronization with the position of the modified hybrid modulation symbol.

12. The apparatus of claim 10, wherein the hybrid modulation scheme change information comprises a position of the modified hybrid modulation symbol, the constellation re-configurer is further configured to reconfigure the constellation diagrams for use in demodulation using previously stored power information of the modified hybrid modulation symbol and output the reconfigured constellation diagrams to the demodulator, and the demodulator is further configured to perform demodulation on the modified hybrid modulation symbol using the received constellation diagrams.

13. The apparatus of claim 10, wherein the hybrid modulation scheme change information comprises a multi-tone set index indicating tone arrangement and power allocation in the modified hybrid modulation symbol and position at which the modified hybrid modulation symbol transmission is considered, and the constellation re-configurer is further configured to reconfigure the constellation diagrams based on powers allocated to the respective tones of the modified hybrid modulation symbol and output the reconfigured constellation diagrams and tone arrangement information of the modified hybrid modulation symbol to the demodulator in synchronization with the position at which the modified hybrid modulation symbol transmission is considered.

14. The apparatus of claim 13, wherein the position at which the modified hybrid modulation symbol transmission is considered is a pilot symbol position of a neighbor cell.

15. The apparatus of claim 10, wherein the hybrid modulation scheme change information comprises a position at which the modified hybrid modulation symbol transmission is considered, the constellation re-configurer is further configured to reconfigure the constellation diagrams based on powers allocated to respective tones of the modified hybrid modulation symbol and output the reconfigured constellation diagrams to the demodulator in synchronization with the position at which the modified hybrid modulation symbol transmission is considered, and the demodulator is further configured to demodulate the input symbols using the reconfigured constellation diagrams and constellation diagrams before reconfiguration at the positon at which the modified hybrid modulation symbol transmission is considered.

16. The apparatus of claim 15, wherein the position at which the modified hybrid modulation symbol transmission is considered is a pilot symbol position of a neighbor cell.

17. The apparatus of claim 10, wherein the hybrid modulation scheme change information comprises an indicator indicating whether a modified hybrid modulation symbol exists, the constellation re-configurer is further configured to reconfigure the constellation diagrams for use in demodulation based on previously-stored modified hybrid modulation symbol transmit power, and the demodulator is further configured to try demodulation on all received symbols using the reconfigured constellation diagrams and original constellation diagrams before reconfiguration.

18. The apparatus of claim 1, wherein the modified hybrid modulation symbol is a symbol of which at least two tones carrying data that are equal in amount to data carried by the hybrid modulation symbol and of which modulation orders and transmit powers are reduced as compared to the hybrid modulation symbol.

19. The apparatus of claim 18, wherein the hybrid modulation scheme change information comprises a multi-symbol set index indicating arrangement of tones of the modified hybrid modulation symbol, per-tone modulation orders, and power-down of transmit power, and information on a position at which the modified hybrid modulation symbol is transmitted.

20. The apparatus of claim 18, wherein the hybrid modulation scheme change information comprises a position at which the modified hybrid modulation symbol is transmitted, and the constellation re-configurer is further configured to reconfigure the constellation diagrams for use in demodulation using the modulation orders and transmit powers at respective tones of previously-stored modified hybrid modulation symbol and output the reconfigured constellation diagrams to the demodulator in synchronization of the position of the modified hybrid modulation symbol.

21. The apparatus of claim 18, wherein the hybrid modulation scheme change information comprises a position at which the modified hybrid modulation symbol transmission is considered, the constellation re-configurer is further configured to reconfigure the constellation diagrams for use in demodulation using the previously stored modulation orders and transmit powers applicable to the tones of the modified hybrid modulation symbol and output the reconfigured constellation diagrams to the demodulator in synchronization with the position at which the modified hybrid modulation symbol transmission is considered.

22. The apparatus of claim 18, wherein the hybrid modulation scheme change information comprises an indicator indicating whether the modified hybrid modulation symbol exists, the constellation re-configurer is further configured to reconfigure the constellation diagrams for use in demodulation using the previously stored modulation orders and transmit powers applicable to the tones of the modified hybrid modulation symbol and output the reconfigured constellation diagrams in synchronization at the position at which the modified hybrid modulation symbol transmission is considered, and the demodulator is further configured to try demodulation on all received symbols using the reconfigured constellation diagrams and original constellation diagrams before reconfiguration.

23. The apparatus of claim 1, wherein the modified hybrid modulation symbol is a symbol including a plurality of tones that modulation orders are reduced to carry data which are equal in amount to data carried by the hybrid modulation symbol and of which transmit powers are reduced by splitting the transmit power of a tone carrying data in the hybrid modulation symbol into a number of the tones.

24. The apparatus of claim 23, wherein the hybrid modulation scheme change information comprises a transmission position of the modified hybrid modulation symbol, and the constellation re-configurer is further configured to reconfigure the constellation diagrams for use in modulation using modulation orders and transmit powers applicable to respective tones of the modified hybrid modulation symbol and output the reconfigured constellation diagrams to the demodulator at the transmission position of the modified hybrid modulation symbol.

25. The apparatus of claim 23, wherein the hybrid modulation scheme change information comprises a position at which modified hybrid modulation symbol transmission is considered, the constellation re-configurer is further configured to reconfigure the constellation diagrams for use in demodulation using previously stored modulation orders and transmit powers applicable to tones of the modified hybrid modulation symbol and output the reconfigured constellation diagrams to the demodulator at the position at which modified hybrid modulation symbol transmission is considered.

26. The apparatus of claim 23, wherein the hybrid modulation scheme change information comprises an indicator configured to indicate whether the modified hybrid modulation symbol exists, the constellation re-configurer is further configured to reconfigure the constellation diagrams for use in demodulation using previously stored modulation orders and transmit powers application to the tones of the modified hybrid modulation scheme and output the reconfigured constellation diagrams to the demodulator, and the demodulator is further configured to try demodulation on all received symbols using the reconfigured constellation diagrams and original diagrams before reconfiguration.

27. An apparatus of demodulating a modulation symbol received in a wireless communication system using a hybrid modulation scheme, the apparatus comprising:
a control channel receiver configured to acquire a hybrid modulation scheme power-down information and information on a position of a symbol to which power-down is applied from a control information received through a control channel;
a power compensator configured to compensate power for a power-down amount at the position of the symbol to which power-down is applied that is notified by the control channel receiver; and
a demodulator configured to demodulate the received symbol modulated in the hybrid modulation scheme.

28. A method of demodulating a modulation symbol received in a wireless communication system using a hybrid modulation scheme, the method comprising:
acquiring a hybrid modulation scheme change information from a control information received through a control channel;
reconfiguring a constellation diagram for use in demodulation with the hybrid modulation scheme change information; and
demodulating a hybrid modulation symbol and a modified hybrid modulation symbol input when a reconfigured constellation diagram is received based on the reconfigured constellation diagram.

29. The method of claim 28, wherein the modified hybrid modulation symbol is a symbol generated by reducing transmit power of the hybrid modulation symbol.

30. The method of claim 28, wherein the modified hybrid modulation symbol is a symbol comprising at least two tones that carry data in same modulation scheme as tones of the hybrid modulation symbol and comprise transmit powers reduced as compared to the hybrid modulation symbol.

31. The method of claim 28, wherein the modified hybrid modulation symbol is a symbol of which at least two tones carrying data that are equal in amount to the data carried by the hybrid modulation symbol and of which modulation orders and transmit powers are reduced as compared to the hybrid modulation symbol.

32. The method of claim 28, wherein the modified hybrid modulation symbol is a symbol including a plurality tones of which modulation orders are reduced to carry data which are equal in amount to the data carried by the hybrid modulation symbol and of which transmit powers are reduced by splitting the transmit power of a tone carrying data in the hybrid modulation symbol into a number of the tones.

33. A method of demodulating a modulation symbol received in a wireless communication system using a hybrid modulation scheme, the method comprising:
acquiring a hybrid modulation scheme power-down information and information on a position of a symbol to which a power-down is applied from a control information received through a control channel;
compensating power for a power-down amount at the position of the symbol to which the power-down is applied; and
demodulating the symbol modulated in the hybrid modulation scheme.

* * * * *